(12) United States Patent
Ikuno et al.

(10) Patent No.: US 8,029,123 B2
(45) Date of Patent: Oct. 4, 2011

(54) MATERIAL SET FOR RECORDING AND RECORDING APPARATUS

(75) Inventors: Masaya Ikuno, Kanagawa (JP); Takatsugu Doi, Kanagawa (JP); Ken Hashimoto, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 12 days.

(21) Appl. No.: 12/271,982

(22) Filed: Nov. 17, 2008

(65) Prior Publication Data

US 2009/0211490 A1   Aug. 27, 2009

(30) Foreign Application Priority Data

Feb. 25, 2008 (JP) ................... 2008-043230

(51) Int. Cl.
*B41J 2/01* (2006.01)
(52) U.S. Cl. ............. 347/100; 428/32.34; 428/32.37
(58) Field of Classification Search ............ 347/100; 106/31.92; 428/32.34, 32.37
See application file for complete search history.

(56) References Cited

U.S. PATENT DOCUMENTS

| 7,776,994 B2 * | 8/2010 | Mera et al. ............. 528/272 |
| 2003/0068571 A1 | 4/2003 | Uehara et al. |
| 2004/0119801 A1 * | 6/2004 | Suzuki et al. ............ 347/100 |
| 2005/0166792 A1 * | 8/2005 | Doi ...................... 106/31.27 |
| 2006/0061620 A1 * | 3/2006 | Tani et al. ................ 347/36 |
| 2006/0286315 A1 | 12/2006 | Hashimoto et al. |
| 2006/0293411 A1 * | 12/2006 | Ueki et al. .............. 523/160 |
| 2007/0221078 A1 * | 9/2007 | Namba et al. ........... 101/327 |

FOREIGN PATENT DOCUMENTS

| JP | 56040584 A * | 4/1981 |
| JP | 5-96720 | 4/1993 |
| JP | 2006-347085 | 12/2006 |

* cited by examiner

*Primary Examiner* — Matthew Luu
*Assistant Examiner* — Rut Patel
(74) *Attorney, Agent, or Firm* — Fildes & Outland, P.C.

(57) ABSTRACT

A material set for recording includes: ink receiving particles that include a resin having an acid value of from about 50 mg KOH/g to about 750 mg KOH/g, and have a neutralization degree of from more than 0 to less than 1; and an ink that includes at least a colorant, a water-soluble solvent, and water, a value obtained by multiplying an electrical conductivity σ (S/m) of the ink by a viscosity η (mPa·s) of the ink being from about 0.02 to about 5.0.

8 Claims, 8 Drawing Sheets

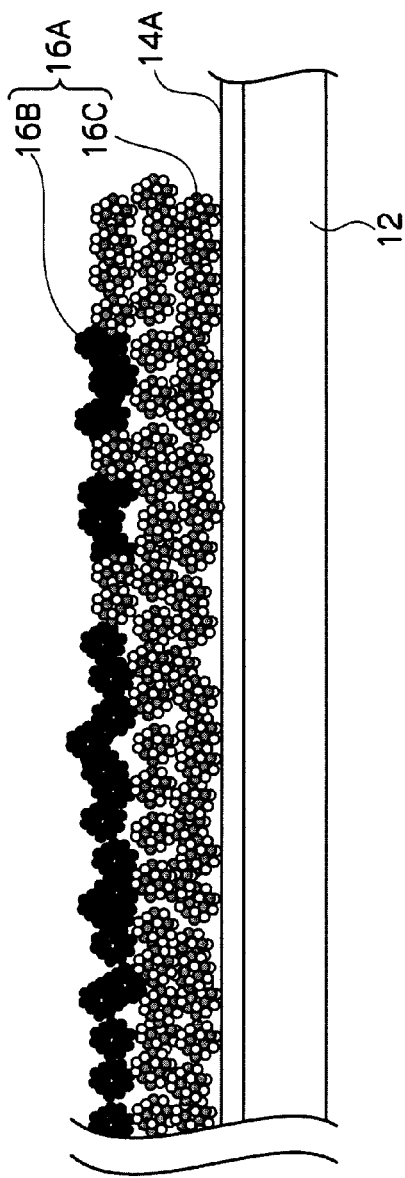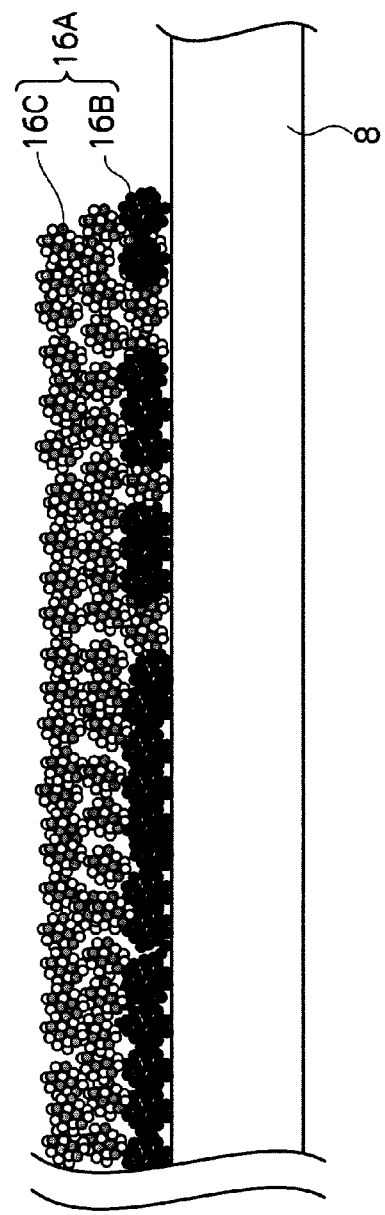

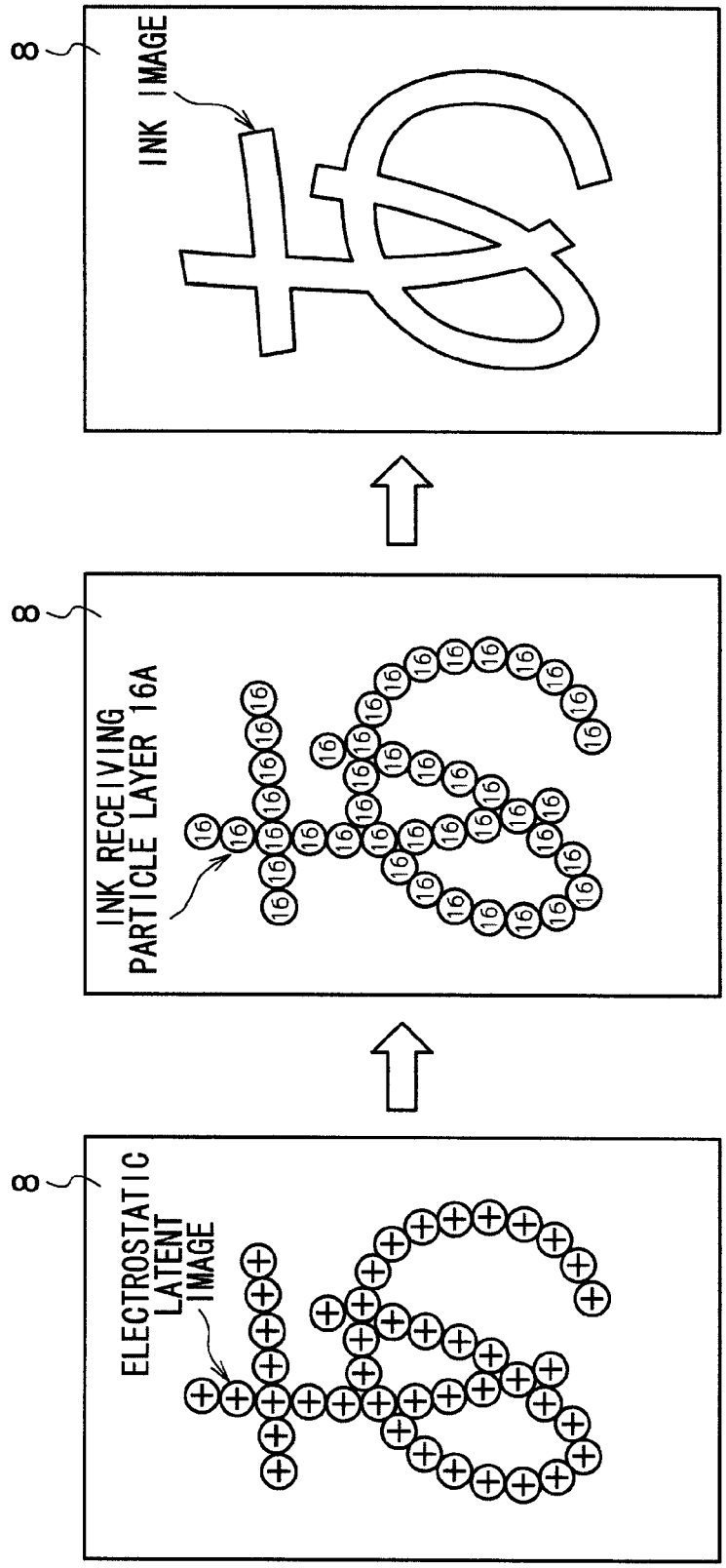

US 8,029,123 B2

MATERIAL SET FOR RECORDING AND RECORDING APPARATUS

CROSS-REFERENCE TO RELATED APPLICATIONS

This application is based on and claims priority under 35 USC 119 from Japanese Patent Application No. 2008-043230 filed Feb. 25, 2008.

BACKGROUND

1. Technical Field

The present invention relates to a material set for recording and a recording apparatus.

2. Related Art

The inkjet recording method is known as one of the methods of recording images and data by using ink. The principle of the inkjet recording method is to record on paper, cloth, film or the like by ejecting liquid or melted solid ink from a nozzle, slit, porous film or the like.

Ink ejecting methods include a charge control method of ejecting ink by making use of electrostatic attraction forces, a pressure pulse method of ejecting ink by making use of the oscillation pressure of piezo elements, a thermal inkjet method of ejecting ink by making use of pressure caused by forming and growing foams by intense heat, and others, and a recorded material on which images or data of extremely high definition are recorded may be obtained by using these methods.

As a recording method using ink (including the inkjet recording method), a recording method comprising applying ink droplets onto an intermediate transfer body on which ink receiving particles have been applied, and transferring them to a recording medium has been proposed, in order to carry out high quality recording on various recording media such as permeable media and impermeable media.

SUMMARY

According to an aspect of the invention, there is provided a material set for recording, comprising ink receiving particles and an ink, wherein the ink receiving particles contain a resin having an acid value of from about 50 mg KOH/g to about 750 mg KOH/g, the ink receiving particles having a neutralization degree of from more than 0 to less than 1, and the ink contains a colorant, a water-soluble solvent, and water, the ink having a value obtained by multiplying an electrical conductivity $\sigma$ (S/m) of the ink by a viscosity $\eta$ (mPa·s) of the ink being from about 0.02 to about 5.0.

BRIEF DESCRIPTION OF THE DRAWINGS

Exemplary embodiments of the present invention will be described in detail based on the following figures, wherein:

FIGS. 5A and 5B are schematic diagrams showing an ink receiving particle layer according to an exemplary embodiment;

FIGS. 8A, 8B and 8C are views conceptually showing a process in which an image is formed in the recording apparatus according to another exemplary embodiment.

DETAILED DESCRIPTION

Figure 1:
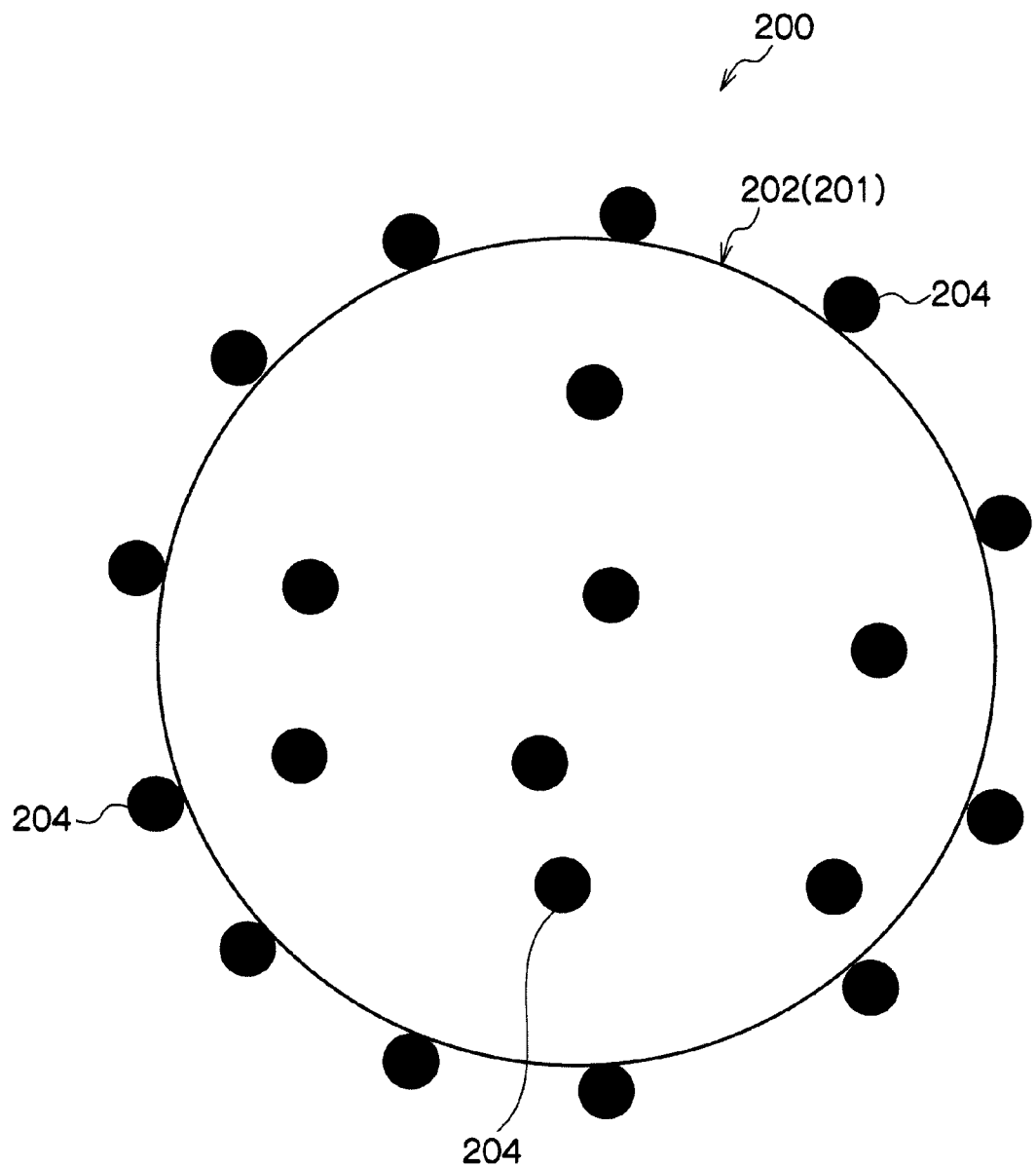
FIG. 1 is a schematic diagram showing an example of an ink receiving particle according to an exemplary embodiment.

First Exemplary Embodiment: Material Set for Recording

The material set for recording according to the first exemplary embodiment comprises: ink receiving particles that comprise a resin having an acid value of from about 50 mg KOH/g to about 750 mg KOH/g, and have a neutralization degree of from more than 0 to less than 1; and an ink that comprises at least a colorant, a water-soluble solvent, and water, a value obtained by multiplying an electrical conductivity $\sigma$ (S/m) of the ink by a viscosity $\eta$ (mPa·s) of the ink being from about 0.02 to about 5.0.

Ink receiving particles in the first exemplary embodiment receive ink components when the particles come in contact with ink.

Here, the term "ink receiving" means retaining at least part of the ink components (at least liquid components).

Till now, the image bleeding and the decrease in optical density have been problems in image formation. The inventors have found that these problems are related to the ink absorbing speed of the ink receiving particles. For example, it may be considered that when the ink absorbing speed of the ink receiving particles is low, a part of the ink is not absorbed and spread on the surface of the particle layer, causing image bleeding, and due to the spreading of the ink, the ink amount per unit area is decreased, so that the optical density is decreased. In contrast, it may be considered that when the ink absorbing speed of the ink receiving particles is high, the dots are constricted and thus not filled with an appropriate amount of ink, so that the optical density is decreased.

In this regard, the inventors have found that the ink absorbing speed of the ink receiving particles may be controlled based on the electrolyte concentration difference between the ink and the ink receiving particles.

Further, the inventors have found that the electrolyte concentration difference may be controlled by appropriately balancing the acid value of the resin included in the ink receiving particles, the neutralization degree of the ink receiving particles, and the value obtained by multiplying an electrical conductivity of the ink by a viscosity of the ink.

Hereinafter, ink receiving particles and an ink according to the first exemplary embodiment will be explained in detail.

(Ink Receiving Particles)

Acid Value of Resin

The ink receiving particles according to the first exemplary embodiment includes a resin having an acid value of from about 50 mg KOH/g to about 750 mg KOH/g. The acid value may be from 100 mg KOH/g to 700 mg KOH/g, or from 200 mg KOH/g to 600 mg KOH/g.

Here, the acid value of the resin is determined by measuring the amount of (COOH) by neutralization titration of the material with KOH. Specifically, the resin is dissolved in an IPA (isopropyl alcohol)/water mixed solvent, and the consumption of KOH is measured by the acid value measuring method (using a potentiometer and a pH meter) based on the electric potential difference in accordance with JIS K2501 (2003) (the disclosure of which is incorporated by reference herein), whereby the acid value may be determined.

In order to control the acid value of the resin within the above described range, for example, the amount of a monomer having a carboxylic acid group in the resin may be adjusted so as to obtain an intended acid value.

Neutralization Degree

The ink receiving particles according to the first exemplary embodiment have a neutralization degree of from more than 0 to less than 1. The neutralization degree may be from 0.1 to 0.9, or from 0.2 to 0.8.

Here, the neutralization degree of the ink receiving particles is determined by providing two samples of ink receiving particles, carrying out neutralization titration of one sample with KOH for measuring (A) the amount of the (COOH), and carrying out titration of the other sample with HCl for measuring (B) the amount of (COO$^-$), and calculating the equation "Neutralization degree=(B)/[(A)+(B)]".

Specifically, two samples of ink receiving particles are provided, one sample is dissolved in an IPA/water mixed solvent, and the consumption of KOH is measured by the acid value measuring method (using a potentiometer and a pH meter) based on the electric potential difference in accordance with JIS K2501 (2003), whereby the mol amount of (COOH) in the ink receiving particles may be determined. And, the other sample is dissolved in IPA/water mixed solvent, a HCl aqueous solution is used as a titration solution, and the consumption of HCl is measured by the acid value measuring method (using a potentiometer and a pH meter) based on the electric potential difference in accordance with JIS K2501 (2003), whereby the mol amount of (COO$^-$) in the ink receiving particles may be determined. Thus, the neutralization degree is calculated from the above equation.

In order to control the neutralization degree within the above described range, for example, a neutralizer such as NaOH may be added to an unneutralized polymer having a carboxylic acid group so as to obtain an intended neutralization degree.

In the ink receiving particles according to the first exemplary embodiment, a value obtained by multiplying the acid value (mg KOH/g) of the resin by the neutralization degree of the ink receiving particles may be from about 50 to about 500, or from 100 to 300.

Particle Diameter

The ink receiving particles according to the first exemplary embodiment may have an average equivalent spherical diameter of from about 0.1 μm to about 20 μm, or from 1 μm to 15 μm, or from 3 μm to 10 μm.

Here, the average equivalent spherical diameter is a volume average particle diameter, which may be measured by HORIBA LA950 dry type particle diameter measuring apparatus.

Next, the ink receiving particles is further explained in detail.

The ink receiving particle may be composed of a single particle (hereinafter may be referred to as a "primary particle") of a liquid absorbing particle, or may be a composite particle in which at least liquid absorbing particles are aggregated. The single particle of the liquid absorbing particle or the composite particle in which at least the liquid absorbing particles are aggregated may be referred to as a "mother particle".

Here, in the case of the embodiment in which the ink receiving particle is composed of the single particle of the liquid absorbing particle, if ink is adhered to the ink receiving particle when the ink receiving particle receives ink, at least a liquid component of the ink is absorbed by the liquid absorbing particle.

Thus, the ink receiving particle receives the ink. The ink receiving particle having received the ink is transferred onto the recording medium, and thereby recording is carried out.

In the case where the ink receiving particle is composed of the composite particle in which at least liquid absorbing particles are aggregated, when the ink receiving particle receives the ink, first, the ink is adhered to the ink receiving particle, and at least a liquid component of the ink is trapped by the gaps (hereinafter the gaps between the particles may be referred to as a "trap structure") between the particles (at least liquid absorbing particles) constituting the composite particles. At this time, the colorant in the ink components is adhered to the ink receiving particle surface or is trapped by the trap structure. Then the ink trapped in the gaps is absorbed by the particles. Thus, the ink receiving particle receives the ink. The ink receiving particles which have received the ink is transferred onto the recording medium, and thereby recording is carried out.

Trapping of ink components (liquid components and the colorant) by this trap structure is physical and/or chemical trapping by gaps between particles (physical particle wall structure).

When the composite particles in which at least liquid absorbing particles are aggregated are used, ink liquid components are trapped in gaps between particles included in the composite particle (physical particle wall structure), and are also absorbed and retained by the liquid absorbing particles.

After transfer of the ink receiving particles, a component in the liquid absorbing particle included in the ink receiving particle functions as a binder resin or coating resin for the colorant contained in the ink. In particular, a transparent resin may be used as the component of the liquid absorbing particle included in the ink receiving particle.

In order to improve the fixing property (rubbing resistance) of ink (e.g. pigment ink) containing dispersed particles or insoluble components such as pigment as a colorant, a large amount of resin needs to be added to the ink. However, when a large amount of polymer is added to the ink (including treatment liquids), the nozzle of the ink ejecting unit may clog, and reliability is decreased. In this regard, in the first exemplary embodiment of the invention, the resin component included in the ink receiving particles may function as such a resin.

Here, "gaps between particles included in the composite particle", namely, the "trap structure" is a physical particle wall structure capable of trapping at least liquid. The size of the gaps may be 0.1 μm to 5 μm, or from 0.3 μm to 1 μm in terms of maximum opening size. In particular, the size of gaps may be large enough to trap a colorant, particularly for example, pigment having a volume-average particle diameter of about 100 nm. Fine pores of maximum opening size of less than 50 nm may be present. In addition, gaps, capillary, or the like may communicate with each other inside of the composite particle.

The gap size may be determined by reading a scanning electron microscope (SEM) image of the particle surface by an image analyzer, detecting the gap by binary coding process, and analyzing the size and distribution of gaps.

The trap structure may trap not only the liquid component of the ink but also the colorant. When colorant, especially pigment, is trapped in the trap structure together with the ink liquid components, the colorant is retained and fixed within the ink receiving particles without being unevenly distributed. Ink liquid components are mainly ink solvents or dispersion media (vehicle liquids).

As mentioned above, the ink receiving particle of the first exemplary embodiment may be the form in which a mother particle is composed of a single particle of a liquid absorbing particle or may be the form which is composed of a composite particle in which at least liquid absorbing particles are aggregated.

In addition to the above-mentioned resin, other components (for example, an inorganic material etc.) may be contained in the liquid absorbing particle.

In the mother particle, inorganic particles may be adhered onto the surface of the liquid absorbing particle or the composite particle.

Figure 2:
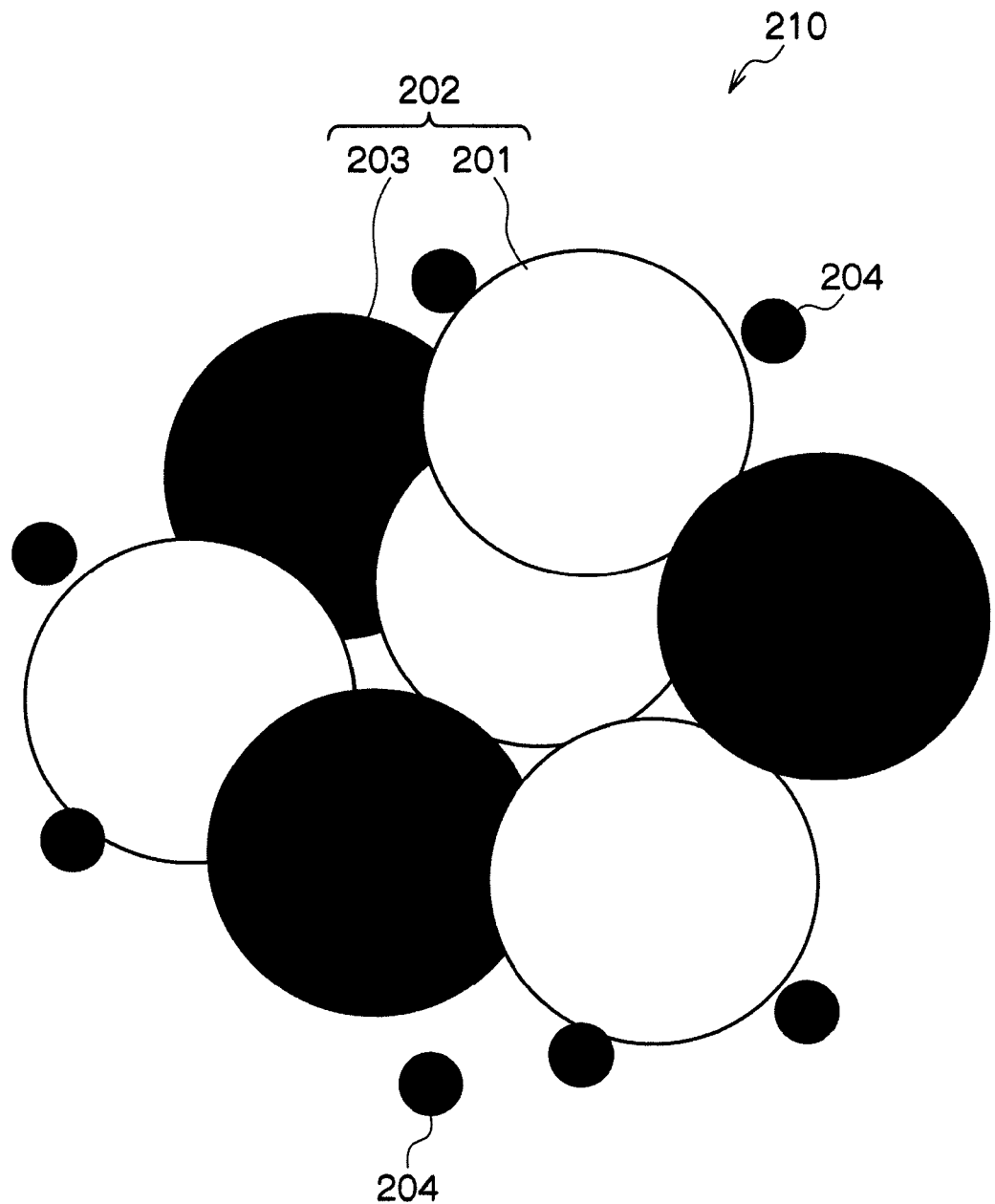
FIG. 2 is a schematic diagram showing another example of the ink receiving particle according to an exemplary embodiment.

Specific constitution of the ink receiving particle of the first exemplary embodiment may be, for example, as shown in FIG. 1, the form of an ink receiving particle 200 containing a mother particle 202 composed of a single particle of a liquid absorbing particle 201 and inorganic particles 204 which are adhered to the surface of the mother particle 202 (liquid absorbing particle 201). Alternatively, as shown in FIG. 2, the specific constitution may be the form of an ink receiving particle 210 containing a mother particle 202 composed of a composite particle in which the liquid absorbing particles 201 are complexed with inorganic particles 203, and inorganic particles 204 which are adhered to the surface of the mother particle 202 (composite particle). In the composite particle, a gap structure is formed by gaps between particles.

When the mother particle is the composite particle, the weight ratio of liquid absorbing particles to other particles (liquid absorbing particles:other particles) may be, in the case where other particles are inorganic particles, from 5:1 to 1:10.

When the mother particle is the composite particle, the BET specific surface area ($N_2$) may be from 1 $m^2/g$ to 750 $m^2/g$.

When the mother particle is the composite particle, the composite particle is obtained, for example, by granulating particles in a semi-sintered state. The semi-sintered state is a state in which some of the granular shape remains and gaps are retained between the particles. When an ink liquid component is trapped in the trap structure, part of the composite particle may be dissociated, that is, the composite particle may be broken up, and particles included in the composite particle may be separated.

In the case where the mother particle is a primary particle, the average equivalent spherical diameter of the liquid absorbing particle is, for example, from 0.1 µm to 50 µm, or from 0.5 µm to 25 µm, or from 1 µm to 10 µm. In the case where the composite particle is used, the average equivalent spherical diameter of the liquid absorbing particle is, for example, from 10 nm to 30 µm, or from 50 nm to 10 µm, or from 0.1 µm to 5 µm.

The weight ratio of the liquid absorbing particle to the ink receiving particle as a whole is, for example, 75% or more, or 85% or more, or from 90% to 99%.

Next, the liquid absorbing particle will be further described in detail. The liquid absorbing particle may include a resin which is formed by a hydrophilic monomer and a hydrophobic monomer. A hydrophilic group having a salt structure and a hydrophilic group not having a salt structure may be included in the hydrophilic monomer.

Here, examples of the hydrophilic group not having a salt structure include a carboxyl group, a hydroxyl group, an epoxy group, a glycidyl group, a sulfone group, an isocyanate group, an acetic anhydride group, and the like. Among them, a specific example is a carboxyl group.

On the other hand, examples of the salt structure of the hydrophilic group having a salt structure include a salt structure formed of the hydrophilic group not having a salt structure and an alkali metal, a salt structure formed of the hydrophilic group not having a salt structure and a polyvalent metal, and a salt structure formed of the hydrophilic group not having a salt structure and an organic amine. The alkali metal, polyvalent metal, and organic amine are so-called counter ions forming salt structures.

Examples of the alkali metal include $Na^+$, $Li^+$, $K^+$, and the like. Examples of the polyvalent metal include an aluminum ion, barium ion, calcium ion, copper ion, iron ion, magnesium ion, manganese ion, nickel ion, tin ion, titanium ion, zinc ion, and the like. Examples of the organic amine include primary, secondary, tertiary, and quaternary amines, and salts thereof. Specific examples of the polyvalent metal ion include an aluminum ion, barium ion, calcium ion, magnesium ion, and zinc ion. Specific examples of the counter ion forming the above-mentioned salt structure include an alkali metal (e.g. $Na^+$, $Li^+$, $K^+$).

The molar ratio of the hydrophilic group not having a salt structure may be from 5 mol % to 50 mol %, or from 10 mol % to 40 mol %, or from 30 mol % to 40 mol % relative to the total amount of the monomer component of the ink receiving particles.

The molar ratio of the hydrophilic group having a salt structure may be from 5 mol % to 40 mol %, or from 10 mol % to 30 mol %, or from 20 mol % to 30 mol % relative to the total amount of the monomer component of the ink receiving particles.

The molar ratio of the hydrophilic group having a salt structure relative to the total amount of the hydrophilic groups may be in a range of from 0.3 to 0.7, or in a range of from 0.3 to 0.5. Here, the total amount of the hydrophilic groups means an amount represented by the formula "hydrophilic group having a salt structure+hydrophilic group not having a salt structure", and the molar ratio of the hydrophilic group having a salt structure relative to the total amount of the hydrophilic groups means a ratio represented by the formula "hydrophilic groups having a salt structure/(hydrophilic groups not having a salt structure+hydrophilic groups having a salt structure)".

Example of methods for containing a hydrophilic group not having a salt structure and a hydrophilic group having a salt structure in the resin include the following methods:

1) a resin is dispersed in a solvent, then partially neutralized with a base, then the resin is aggregated;

2) a resin is dissolved in a solvent, then partially neutralized with a base, then the resultant solution is concentrated to obtain a resin; and 3) a base is sprayed onto a resin and then dried.

The molar ratio of the hydrophilic group not having a salt structure is determined as follows. A resin is dissolved in an IPA (isopropyl alcohol)/water mixture. The molar ratio of [COOH] or [$SO_3H$] is determined by conductimetric titration of the resulting solution using potassium hydroxide. When the resin contains a hydroxyl group, the acid value is measured by a conductimetric titration method in accordance with JIS K0070 (the disclosure of which is incorporated by reference herein). Then, the total molar ratio of the hydrophilic group not having a salt structure is determined.

A molar ratio of the hydrophilic group having a salt structure is determined as follows. A resin is dissolved in an IPA/water mixture. The molar ratio of [$COO^-$] or [$SO_3^-$] is determined by conductimetric titration of the resulting solution using hydrochloric acid.

Next, the resin will be described. Examples of the resin included in the liquid absorbing particle include a copolymer formed by both a hydrophilic monomer and a hydrophobic monomer. However, a graft copolymer or a block copolymer prepared by copolymerizing starting unit such as a polymer/ oligomer structure with other units may be used as the resin.

Examples of the hydrophilic monomer include the monomer which contains at least α-β unsaturated ethylene and has a hydrophilic group not having the salt structure and a hydrophilic group having the salt structure. For example, when the ink receiving particle is charged positively, a monomer having a salt forming structure such as (substituted) amino group, (substituted) pyridine group and its amine salt, or quaternary ammonium salt may be used. When the ink receiving particle is charged negatively, a monomer having an organic acid group (a carboxyl group, or a sulfone group) and its salt structure may be used.

Specific examples of the hydrophilic monomer include (meth)acrylic acid, crotonic acid, itaconic acid, itaconic acid monoester, maleic anhydride, maleic acid monoester, fumaric acid, fumaric acid monoester, sorbic acid, vinyl sulfonic acid, sulfonated vinylnaphthalene, hydroxy alkyl, and the like. Among them, a specific example is (meth)acrylic acid.

Examples of a hydrophilic unit such as a polymer/oligomer structure include cellulose derivatives such as cellulose, ethyl cellulose, carboxy methyl cellulose; starch derivatives, monosaccharide or polysaccharide derivatives, polymerizable carboxylic acids such as vinyl sulfonic acid, styrene sulfonic acid, acrylic acid, methacrylic acid, (anhydrous) maleic acid, and (partially) neutralized salts thereof; vinyl alcohols; vinyl pyrrolidone, vinyl pyridine, amino(meth) acrylate or dimethyl amino(meth)acrylate, or onium salts thereof, amide such as acrylamide and isopropyl acrylamide; vinyl compounds containing polyethylene oxide chain; vinyl compounds containing hydroxyl group; polyesters composed of multifunctional carboxylic acid and polyhydric alcohol; branched polyesters containing tri- or higher functional acids such as trimellitic acid and containing many terminal carboxylic acids or hydroxyl groups, polyester having polyethylene glycol structure, and the like.

As for the above-mentioned (meth) and (anhydrous), it should be noted that the compound name in parentheses is also included (the same applies in the following).

Examples of the hydrophobic monomer include the monomer which contains at least α-β-unsaturated ethylene and has a hydrophobic group. The hydrophobic monomer may not contain a hydrophilic group not having the salt structure or a hydrophilic group having the salt structure.

Specific examples of the monomer having a hydrophobic group which is used as a hydrophobic monomer include olefins (ethylene, butadiene, etc.), styrene, α-methyl styrene, α-ethyl styrene, methyl methacrylate, ethyl methacrylate, butyl methacrylate, acrylonitrile, vinyl acetate, methyl acrylate, ethyl acrylate, butyl acrylate, lauryl(meth)acrylate, and the like. Examples of the hydrophobic monomer include styrene derivatives such as styrene, α-methyl styrene and vinyltoluene, vinyl cyclohexane, vinyl naphthalene, vinyl naphthalene derivatives, alkyl acrylate, phenyl acrylate, alkyl (meth)acrylate, phenyl(meth)acrylate, cycloalkyl(meth) acrylate, alkyl crotonate, dialkyl itaconate, dialkyl maleate, and the derivatives thereof. Among them, butadiene, isoprene, propylene, alkyl(meth)acrylate, alkyl crotonate, alkyl itaconate, alkyl maleate, and styrene may be used. Butadiene, alkyl(meth)acrylate, and styrene may be used.

Here, the molar ratio of hydrophobic group may be from 20 mol % to 80 mol %, or from 40 mol % to 70 mol % relative to the total amount of monomer components contained in the ink receiving particles.

The molar ratio of hydrophobic group is determined by the following formula:

The molar ratio of hydrophobic group=100−[the molar ratio of hydrophilic group not having a salt structure]−[the molar ratio of hydrophilic group having a salt structure]

Specific examples of copolymers of the hydrophilic monomer and the hydrophobic monomer include olefin copolymers (or its modifications, or products into which a carboxylic acid unit is introduced by copolymerization) such as styrene/alkyl (meth)acrylate/(meth)acrylic acid copolymer, styrene/(meth)acrylic acid/(anhydrous) maleic acid copolymer, and ethylene/propylene, branched polyesters enhanced in acid value by trimellitic acid or the like, polyamides, and the like.

The resin may contain a substituted or non-substituted amino group, or a substituted or non-substituted pyridine group. Such a group has a bactericidal effect or interaction with a colorant having an anion group (e.g. a pigment or a dye).

In the resin, the molar ratio (hydrophilic monomer: hydrophobic monomer) of hydrophilic unit (hydrophilic monomer) and hydrophobic unit (hydrophobic monomer) may be 5:95 to 70:30.

The resin may be ion-crosslinked by ions supplied from ink. In this case, the resin may contain a unit having carboxylic acid, and examples include copolymers containing a carboxylic acid such as (meth)acrylic acid or maleic acid, and (branched) polyesters having a carboxylic acid. Ion crosslinking or acid-base interaction occurs between the carboxylic acid in the resin, and alkaline metal cation, alkaline earth metal cation, organic amine, or onium cation, or the like, which is supplied from liquid such as water-based ink.

The resin may be the liquid absorbing resin. In this case, the absorbed ink liquid component (for example, water or waterbased solvent) acts as plasticizer of resin (polymer), and the resin is softened and the fixing property may be improved.

The resin may be weak liquid absorbing resin. The weak liquid absorbing resin is, for example, when absorbing water as liquid, a resin capable of absorbing the liquid in an amount of several percent (approximately 5 percent) or more but hundreds percent (approximately 500 percent) or less, or from 5% to 100% relative to the weight of the resin.

The resin may have a straight chain structure, but the resin may have a branched structure. The resin may be non-crosslinked or low crosslinked. The resin may be a random copolymer or block copolymer of the straight chain structure, or may be a polymer of the branched structure (examples thereof including a random copolymer, block copolymer and graft copolymer of branched structure). For example, in the case of polyesters synthesized by polycondensation, the end group may be increased in the branched structure. Such branched structure may be obtained by general techniques, that is, (for example, less than 1% of) a crosslinking agent such as divinyl benzene or di(meth)acrylate is added at the time of synthesizing or a large amount of an initiator is added together with the crosslinking agent.

A charge controlling agent for electrophotographic toner such as a salt forming compound such as quaternary ammonium salt of low molecular weight, organic borate, and salicylic acid derivative may be added to the resin. For controlling the conductivity, it is effective to add conductive (here, the conductivity indicates that the volume resistivity is less than $10^7$ Ω·cm; unless otherwise specified, the same applies hereinbelow) or semiconductive (here, the semi-conductivity indicates that the volume resistivity is in the range of from $10^7$ Ω·cm to $10^{13}$ Ω·cm, and unless otherwise specified, the same applies hereinbelow) inorganic materials such as tin oxide and titanium oxide.

The resin may be an amorphous resin, and its glass transition temperature (Tg) may be from 30° C. to 100° C., or from 40° C. to 60° C. The glass transition temperature (and melting point) is determined from the major maximum peak measured in accordance with ASTMD 3418-8. The major maximum peak may be measured by using DSC-7 (manufactured by PerkinElmer Japan Co., Ltd.). In this apparatus, temperature of a detection unit is corrected by melting point of indium and zinc, and the calorimetric value is corrected by using fusion heat of indium. For the sample, an aluminum pan is used, and for the control, an empty pan is set. Measurement is carried out at an elevated rate of temperature of 10° C./min.

The weight-average molecular weight of the resin is, for example, from 3,000 to 100,000, or from 4,000 to 75,000, or from 5,000 to 50,000.

The weight-average molecular weight is measured under the following conditions. For example, the GPC apparatus used is HLC-8120GPC, SC-8020 (manufactured by Tosoh Corporation), as the column, two pieces of TSK gel, SuperHM-H (manufactured by Tosoh Corporation, 6.0 mm ID×15 cm) are used, and the eluent is THF (tetrahydrofuran). The experiment is carried out under the following conditions: the sample concentration of 0.5%, flow velocity of 0.6 ml/min, sample injection amount of 10 µl, measuring temperature of 40° C., and IR detector. Calibration curve is prepared from ten samples of polystyrene standard samples TSK standards (trade names: A-500, F-1, F-10, F-80, F-380, A-2500, F-4, F-40, F-128, and F-700, manufactured by Tosoh Corporation).

Next, the inorganic particle included in composite particle together with the liquid absorbing particle, as well as the inorganic particle to be adhered to the mother particle together with the hydrophobic organic particle will be described. As inorganic particle, both a porous particle and a non-porous particle may be used. Examples of the inorganic particle include colorless, pale color, or white particles (e.g. colloidal silica, alumina, calcium carbonate, zinc oxide, titanium oxide, tin oxide, and the like). These inorganic particle may be surface treated (partial hydrophobic treatment, introduction of specific functional group, etc.). In the case of silica, for example, a hydroxyl group of silica is treated with a silylating agent such as trimethyl chlorosilane or t-butyl dimethyl chlorosilane to introduce an alkyl group. Then, dehydrochlorination takes place by the silylating agent, and reaction progresses. When an amine is added to this reaction system, hydrochloric acid is transformed into hydrochloride, and therefore, reaction is promoted. The reaction may be controlled by regulating the treating amount or treating conditions of a silane coupling agent having an alkyl group or phenyl group as a hydrophobic group, or a coupling agent such as titanate type or zirconate type. Similarly, surface treatment may also be carried out by using aliphatic alcohols, higher fatty acids, or derivatives thereof. Further, as for the surface treatment, a coupling agent having a cationic functional group such as a silane coupling agent having quaternary ammonium salt structure, (substituted) amino groups, or the like, a coupling agent having fluorine functional group such as fluorosilane, and other coupling agents having anionic functional group such as carboxylic acid may be used. These inorganic particles may be included in liquid absorbing particles, that is to say, they may be internally added thereto.

The average equivalent spherical diameter of the inorganic particle which is included in the composite particle is, for example, from 10 nm to 30 µm, or from 50 nm to 10 µm, or from 0.1 µm to 5 µm. The average equivalent spherical diameter of the inorganic particles which are adhered to the mother particle is, for example, from 10 nm to 1 µm, or from 10 nm to 0.1 µm, or 10 nm to 0.05 µm.

The ink receiving particle of the first exemplary embodiment may contain components for aggregating or thickening ink components.

The component having such functions may be contained as functional groups, or as compounds in the resin. Examples of such a functional group include carboxylic acid, polyvalent metal cation, polyamine, and the like.

Specific examples of such compound include aggregating agents such as an inorganic an electrolyte, an organic acid, an inorganic acid, and an organic amine.

Examples of the inorganic electrolyte include salts of an alkali metal ion such as a lithium ion, a sodium ion, and a potassium ion, a polyvalent metal ion such as an aluminum ion, a barium ion, a calcium ion, a copper ion, an iron ion, a magnesium ion, a manganese ion, a nickel ion, a tin ion, a titanium ion and a zinc ion; and hydrochloric acid, hydrobromic acid, hydriodic acid, sulfuric acid, nitric acid, phosphoric acid, thiocyanic acid, and an organic carboxylic acid such as acetic acid, oxalic acid, lactic acid, fumaric acid, citric acid, salicylic acid and benzoic acid, and organic sulfonic acid.

Specific examples of the inorganic electrolyte include an alkali metal salt such as lithium chloride, sodium chloride, potassium chloride, sodium bromide, potassium bromide, sodium iodide, potassium iodide, sodium sulfate, potassium nitrate, sodium acetate, potassium oxalate, sodium citrate, and potassium benzoate; and a polyvalent metal salt such as aluminum chloride, aluminum bromide, aluminum sulfate, aluminum nitrate, aluminum sodium sulfate, aluminum potassium sulfate, aluminum acetate, barium chloride, barium bromide, barium iodide, barium oxide, barium nitrate, barium thiocyanate, calcium chloride, calcium bromide, calcium iodide, calcium nitrite, calcium nitrate, calcium dihydrogenphosphate, calcium thiocyanate, calcium benzoate, calcium acetate, calcium salicylate, calcium tartrate, calcium lactate, calcium fumarate, calcium citrate, copper chloride, copper bromide, copper sulfate, copper nitrate, copper acetate, iron chloride, iron bromide, iron iodide, iron sulfate, iron nitrate, iron oxalate, iron lactate, iron fumarate, iron citrate, magnesium chloride, magnesium bromide, magnesium iodide, magnesium sulfate, magnesium nitrate, magnesium acetate, magnesium lactate, manganese chloride, manganese sulfate, manganese nitrate, manganese dihydrogen phosphate, manganese acetate, manganese salicylate, manganese benzoate, manganese lactate, nickel chloride, nickel bromide, nickel sulfate, nickel nitrate, nickel acetate, tin sulfate, titanium chloride, zinc chloride, zinc bromide, zinc sulfate, zinc nitrate, zinc thiocyanate, and zinc acetate.

Examples of the organic acid include arginine acid, citric acid, glycine, glutamic acid, succinic acid, tartaric acid, cysteine, oxalic acid, fumaric acid, phthalic acid, maleic acid, malonic acid, lycine, malic acid, the compounds represented by formula (1), and derivatives of these compounds.

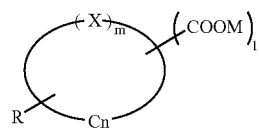

Formula (1)

In formula (1), X represents O, CO, NH, $NR_1$, S, or $SO_2$. $R_1$ represents an alkyl group and may be $CH_3$, $C_2H_5$, and $C_2H_4OH$. R represents an alkyl group and may be $CH_3$, $C_2H_5$, and $C_2H_4OH$. R may be or may not be included in the formula. X may be CO, NH, $NR_1$, or O, or CO, NH, or O. M represents a hydrogen atom, an alkali metal or amines. M may be H, Li, Na, K, monoethanol amine, diethanol amine or triethanol amine, or H, Na, or K, or a hydrogen atom. n represents an integer of from 3 to 7. n may be such a number that a heterocyclic ring is a six-membered ring or five-membered ring, or such a number that the heterocyclic ring is a five-membered ring. m represents 1 or 2. A compound represented by the formula (1) may be a saturated ring or an unsaturated ring when the compound is the heterocyclic ring. l represents an integer of from 1 to 5.

Specific examples of the compound represented by the formula (1) include the compound having any of furan, pyrrole, pyrro line, pyrrolidone, pyrone, thiophene, indole, pyridine, and quinoline structures, and furthermore, having a carboxyl group as a functional group. Specific examples thereof include 2-pyrrolidone-5-carboxylic acid, 4-methyl-4-pentanolide-3-carboxylic acid, furan carboxylic acid, 2-benzofuran carboxylic acid, 5-methyl-2-furan carboxylic acid, 2,5-dimethyl-3-furan carboxylic acid, 2,5-furan dicarboxylic acid, 4-butanolido-3-carboxylic acid, 3-hydroxy-4-pyrone-2, 6-dicarboxylic acid, 2-pyrone-6-carboxylic acid, 4-pyrone-2-carboxylic acid, 5-hydroxy-4-pyrone-5-carboxylic acid, 4-pyrone-2,6-dicarboxylic acid, 3-hydroxy-4-pyrone-2,6-dicarboxylic acid, thiophene carboxylic acid, 2-pyrrole carboxylic acid, 2,3-dimethylpyrrole-4-carboxylic acid, 2,4,5-trimethylpyrrole-3-propionic acid, 3-hydroxy-2-indole carboxylic acid, 2,5-dioxo-4-methyl-3-pyrroline-3-propionic acid, 2-pyrrolidine carboxylic acid, 4-hydroxyproline, 1-methylpyrrolidine-2-carboxylic acid, 5-carboxy-1-methyl pyrrolidine-2-acetic acid, 2-pyridine carboxylic acid, 3-pyridine carboxylic acid, 4-pyridine carboxylic acid, pyridine dicarboxylic acid, pyridine tricarboxylic acid, pyridine pentacarboxylic acid, 1,2,5,6-tetrahydro-1-methyl nicotinic acid, 2-quinoline carboxylic acid, 4-quinoline carboxylic acid, 2-phenyl-4-quinoline carboxylic acid, 4-hydroxy-2-quinoline carboxylic acid, and 6-methoxy-4-quinoline carboxylic acid.

Specific examples of the organic acid include citric acid, glycine, glutamic acid, succinic acid, tartaric acid, phthalic acid, pyrrolidone carboxylic acid, pyrone carboxylic acid, pyrrole carboxylic acid, furan carboxylic acid, pyridine carboxylic acid, coumaric acid, thiophene carboxylic acid, nicotinic acid, or the derivatives or salts thereof. The organic acid may be pyrrolidone carboxylic acid, pyrone carboxylic acid, pyrrole carboxylic acid, furan carboxylic acid, pyridine carboxylic acid, coumaric acid, thiophene carboxylic acid, nicotinic acid, or the derivatives or salts thereof. The organic acid may be pyrrolidone carboxylic acid, pyrone carboxylic acid, furan carboxylic acid, coumaric acid, or the derivatives or salts thereof.

An organic amine compound may be any of a primary amine, secondary amine, tertiary amine, quaternary amine or salts thereof. Specific examples of the organic amine compound include a tetraalkyl ammonium, alkylamine, benzalkonium, alkylpyridium, imidazolium, polyamine and the derivatives or salts thereof. Specific examples of the organic amine compound include amyl amine, butyl amine, propanol amine, propyl amine, ethanol amine, ethyl ethanol amine, 2-ethyl hexyl amine, ethyl methyl amine, ethyl benzyl amine, ethylene diamine, octyl amine, oleyl amine, cyclooctyl amine, cyclobutyl amine, cyclopropyl amine, cyclohexyl amine, diisopropanol amine, diethanol amine, diethyl amine, di-2-ethylhexyl amine, diethylene triamine, diphenyl amine, dibutyl amine, dipropyl amine, dihexyl amine, dipentyl amine, 3-(dimethyl amino)propyl amine, dimethyl ethyl amine, dimethyl ethylene diamine, dimethyl octyl amine, 1,3-dimethyl butyl amine, dimethyl-1,3-propane diamine, dimethyl hexyl amine, amino butanol, amino propanol, amino propane diol, N-acetyl amino ethanol, 2-(2-amino ethyl amino)-ethanol, 2-amino-2-ethyl-1,3-propane diol, 2-(2-amino ethoxy)ethanol, 2-(3,4-dimethoxy phenyl)ethyl amine, cetyl amine, triisopropanol amine, triisopentyl amine, triethanol amine, trioctyl amine, trityl amine, bis(2-aminoethyl) 1,3-propane diamine, bis(3-aminopropyl)ethylene diamine, bis(3-aminopropyl) 1,3-propane diamine, bis(3-amino propyl)methyl amine, bis(2-ethyl hexyl)amine, bis(trimethyl silyl)amine, butyl amine, butyl isopropyl amine, propane diamine, propyl diamine, hexyl amine, pentyl amine, 2-methyl-cyclohexyl amine, methyl-propyl amine, methyl benzyl amine, monoethanol amine, lauryl amine, nonyl amine, trimethyl amine, triethyl amine, dimethyl propyl amine, propylene diamine, hexamethylene diamine, tetraethylene pentamine, diethyl ethanol amine, tetramethyl ammonium chloride, tetraethyl ammonium bromide, dihydroxy ethyl stearyl amine, 2-heptadecenyl-hydroxyethyl imidazoline, lauryl dimethyl benzyl ammonium chloride, cetylpyridinium chloride, stearamid methylpyridium chloride, a diaryl dimethyl ammonium chloride polymer, and diaryl amine polymer, and a monoaryl amine polymer.

More specifically, triethanol amine, triisopropanol amine, 2-amino-2-ethyl-1,3-propanediol, ethanol amine, propane diamine, and propyl amine may be used as the organic amine compound.

Among these aggregating agents, polyvalent metal salts, such as $Ca(NO_3)$, $Mg(NO_3)$, $Al(OH)_3$, and a polyaluminum chloride may be used.

The aggregating agents may either be used alone or two or more kinds of the aggregating agents may be mixed and used. The content of the aggregating agent may be from 0.01% by weight to 30% by weight, or from 0.1% by weight to 15% by weight, or from 1% by weight to 15% by weight.

(Ink)

Value Obtained by Multiplying Electrical Conductivity σ (S/m) by Viscosity η (mPa·s)

In the ink according to the first exemplary embodiment, a value obtained by multiplying an electrical conductivity σ (S/m) of the ink by a viscosity η (mPa·s) of the ink is from about 0.02 to about 5.0. The value may be from 0.03 to 2.0, or from 0.04 to 1.0.

The electrical conductivity σ of the ink may be from about 0.01 S/m to about 2.0 S/m, or from 0.01 S/m to 1.0 S/m, or from 0.01 S/m to 0.25 S/m The electrical conductivity may be measured by MPC 227 (pH/Conductivity Meter, manufactured by METTLER-TOLEDO K.K.)

The viscosity is measured by RHEOMAT 115 (manufactured by Contraves) at a measuring temperature of 23° C. and a shearing rate of 1400 $s^{-1}$.

The electrical conductivity σ of the ink may be adjusted, for example, as follows. That is, the electrical conductivity may be adjusted by adding to the ink an alkali metal compound such as potassium hydroxide, sodium hydroxide or lithium hydroxide, a nitrogen-containing compound such as ammonium hydroxide, triethanolamine, diethanolamine, ethanolamine or 2-amino-2-methyl-1-propanol, an alkaline earth metal compound such as calcium hydroxide, an acid such as sulfuric acid, hydrochloric acid or nitric acid, a salt of a strong acid and a weak alkali such as ammonium sulfate, or the like.

The viscosity η may be adjusted by, for example, adding an aggregating agent or a water soluble solvent.

The ratio of the value obtained by multiplying an electrical conductivity σ (S/m) of the ink by a viscosity η (mPa·s) of the ink to the value obtained by multiplying the acid value (mg KOH/g) of the resin by the neutralization degree of the ink receiving particles may be from about 1:200 to about 1:5000, or from 1:500 to 1:3000.

Next, the ink will be further described in detail.

Both water-based ink and oil-based ink may be used, but from the environmental viewpoint, water-based ink may be used. The water-based ink (hereinafter may be simply referred to as ink) contains, in addition to a colorant, an ink solvent (for example, water or water soluble solvent). As required, other additives may be also contained.

At first, the colorant will be explained. As the colorant, either a dye or a pigment may be used, but a pigment may be used. As the pigment, either an organic pigment or an inorganic pigment may be used. Examples of a black pigment include carbon black pigments such as a furnace black, a lamp black, an acetylene black, and a channel black. In addition to black and three primary colors of cyan, magenta and yellow, specific color pigments of red, green, blue, brown, white, or the like, metal glossy pigments of gold, silver, or the like, colorless or pale color extender pigments, plastic pigments, or the like may be used. Moreover, a pigment newly synthesized for the first exemplary embodiment may be used as well.

Moreover, particles prepared by fixing a dye or a pigment onto the surface of silica, alumina, polymer beads, or the like as the core, an insoluble lake product of a dye, a colored emulsion, a colored latex, or the like may also be used as a pigment.

Specific examples of the black pigment include Raven 7000, Raven 5750, Raven 5250, Raven 5000 ULTRA II, Raven 3500, Raven 2000, Raven 1500, Raven 1250, Raven 1200, Raven 1190 ULTRA II, Raven 1170, Raven 1255, Raven 1080 and Raven 1060 (manufactured by Columbian Chemicals Company); Regal 400R, Regal 330R, Regal 660R, Mogul L, Black Pearls L, Monarch 700, Monarch 800, Monarch 880, Monarch 900, Monarch 1000, Monarch 1100, Monarch 1300 and Monarch 1400 (manufactured by Cabot Corporation); Color Black FW1, Color Black FW2, Color Black FW2V, Color Black 18, Color Black FW200, Color Black S150, Color Black S160, Color Black S170, Printex 35, Printex U, Printex V, Printex 140U, Printex 140V, Special Black 6, Special Black 5, Special Black 4A and Special Black 4 (manufactured by Degussa): and No. 25, No. 33, No. 40, No. 47, No. 52, No. 900, No. 2300, MCF-88, MA 600, MA 7, MA 8, and MA 100 (manufactured by Mitsubishi Chemical Co., Ltd.). However, the pigments are not restricted thereto.

Specific examples of the cyan color pigments include, but are not limited to, C.I. Pigment Blue-1, -2, -3, -15, -15:1, -15:2, -15:3, -15:4, -16, -22, and -60.

Specific examples of the magenta color pigments include, but are not limited to, C.I. Pigment Red-5, -7, -12, -48, -48:1, -57, -112, -122, -123, -146, -168, -177, -184, -202, and C.I. Pigment Violet-19.

Specific examples of the yellow color pigments include, but are not limited to, C.I. Pigment Yellow-1, -2, -3, -12, -13, -14, -16, -17, -73, -74, -75, -83, -93, -95, -97, -98, -114, -128, -129, -138, -151, -154, and -180.

Here, in the case where a pigment is used as the colorant, a combination of the pigment and the pigment dispersing agent may be used. As a usable pigment dispersing agent, a polymer dispersing agent, an anionic surfactant, a cationic surfactant, an amphoteric surfactant, a nonionic surfactant, and the like are exemplified.

As the polymer dispersing agent, a polymer having a hydrophilic structure part and a hydrophobic structure part may be used. As the polymer having a hydrophilic structure part and a hydrophobic structure part, a condensation polymer and an addition polymer may be used. As the condensation polymer, known polyester-based dispersing agents may be exemplified. As the addition polymer, addition polymers of monomers having an α,β-ethylenically unsaturated group may be exemplified. By copolymerizing a monomer having an α,β-ethylenically unsaturated group and a hydrophilic group and a monomer having an α,β-ethylenically unsaturated group and a hydrophobic group in combination, a targeted polymer dispersing agent may be obtained. Moreover, a homopolymer of a monomer having an α,β-ethylenically unsaturated group and a hydrophilic group may be used as well.

As the monomer having an α,β-ethylenically unsaturated group and a hydrophilic group, monomers having a carboxyl group, a sulfonic acid group, a hydroxyl group, a phosphoric acid group, or the like, such as acrylic acid, methacrylic acid, crotonic acid, itaconic acid, itaconic acid monoester, maleic acid, maleic acid monoester, fumaric acid, fumaric acid monoester, vinyl sulfonic acid, styrene sulfonic acid, sulfonated vinyl naphthalene, vinyl alcohol, acrylic amide, methacryloxy ethyl phosphate, bismethacryloxy ethyl phosphate, methacryloxy ethyl phenyl acid phosphate, ethylene glycol dimethacrylate, and diethylene glycol dimethacrylate may be exemplified.

Examples of the monomer having an α,β-ethylenically unsaturated group and a hydrophobic group include styrene derivatives such as styrene, α-methylstyrene and vinyl toluene, vinyl cyclohexane, vinyl naphthalene, vinyl naphthalene derivatives, alkyl acrylate, alkyl methacrylate, phenyl methacrylate, cycloalkyl methacrylate, alkyl crotonate, dialkyl itaconate, dialkyl maleate and the like.

Specific examples of the copolymer which is used as a polymer dispersant include styrene-styrene sulfonic acid copolymer, styrene-maleic acid copolymer, styrene-methacrylic acid copolymer, styrene-acrylic acid copolymer, vinylnaphthalene-maleic acid copolymer, vinylnaphthalene-methacrylic acid copolymer, vinylnaphthalene-acrylic acid copolymer, alkyl acrylate-acrylic acid copolymer, alkyl methacrylate-methacrylic acid copolymer, styrene-alkyl methacrylate-methacrylic acid copolymer, styrene-alkyl acrylate-acrylic acid copolymer, styrene-phenyl methacrylate-methacrylic acid copolymer, and styrene-cyclohexyl methacrylate-methacrylic acid copolymer. Polymers obtained by copolymerizing a monomer having a polyoxyethylene group or a hydroxyl group with these polymers may be used.

The weight-average molecular weight of the polymer dispersant may be from 2,000 to 50,000.

These pigment dispersing agents may either be used alone or in combination of two or more. Although the addition amount of the pigment dispersing agent varies according to the types of the pigments, but in general, it may be added at a ratio of from 0.1% by weight to 100% by weight in total with respect to the pigment.

A pigment self-dispersible in water may be used as a colorant. The pigment self-dispersible in water refers to the pigment having many water-solubilizing groups on the surface of the pigment, which may be stably dispersed in water without adding any polymer dispersant. The pigment self-dispersible in water may be obtained by applying surface modification treatments such as an acid or a base treatment, a coupling agent treatment, a polymer graft treatment, a plasma treatment or a redox treatment on so-called usual pigments.

As a pigment self-dispersible in water, in addition to the above-described surface-modified pigments, commercially available pigments such as Cab-o-jet-200, Cab-o-jet-300, IJX-157, IJX-253, IJX-266, IJX-273, IJX-444, IJX-55, Cabot 260 (manufactured by Cabot Corporation), and Microjet Black CW-1 and CW-2 (manufactured by Orient Chemical Industries, Ltd.) may also be used as the pigment self-dispersible in water.

As the self dispersing pigment, a pigment having as a functional group at least sulfonic acid, sulfonate, carboxylic acid, or carboxylate on the surface thereof may be used. A pigment having as a functional group at least carboxylic acid or carboxylate on the surface thereof may be used.

The pigment coated with a resin may be used as the colorant. Such pigment is called microcapsule pigments, which include commercially available microcapsule pigments manufactured by Dainippon Ink and Chemicals, Incorporated and TOYO INK MFG Co., Ltd. as well as microcapsule pigments prepared for use in the first exemplary embodiment.

Moreover, a resin dispersing type pigment in which a polymer substance is physically adsorbed or chemically bonded with the above-mentioned pigment may also be used.

Other examples of the colorant include dyes such as hydrophilic anionic dye, direct dye, cationic dye, reactive dye, high molecular dye, and oil-soluble dye, wax powder and resin powder colored by dye, emulsions, fluorescent dye or fluorescent pigment, infrared absorber, ultraviolet absorber, magnetic materials such as ferromagnetic materials such as ferrite and magnetite, semiconductor and photo catalysts such as titanium oxide and zinc oxide, and organic and inorganic electronic material particles.

The content (concentration) of the colorant may be from 5% by weight to 30% by weight in the ink.

The volume average particle diameter of the colorant may be from 10 nm to 1,000 nm.

The volume average particle diameter of the colorant denotes the particle diameter of the colorant itself, or when an additive such as a dispersing agent is adhered onto the colorant, the particle diameter of the particles with the additive adhered thereto. In the invention, as the apparatus for measuring the volume average particle diameter, MICROTRUCK UPA particle diameter analysis meter 9340 (manufactured by Leeds & Northrup Corp.) is used. The measurement is carried out with 4 ml of an ink placed in a measurement cell according to a predetermined measuring method. As the parameters to be inputted at the time of the measurement, the viscosity of the ink is inputted as the viscosity, and the density of the colorant is inputted as the density of the dispersion particles.

Next, a water-soluble solvent will be described. As a water-soluble solvent, polyhydric alcohols, a polyhydric alcohol derivative, a nitrogen-containing solvent, alcohols and a sulfur-containing solvent, and the like may be used.

As specific examples of the water-soluble solvent, the polyhydric alcohols include ethylene glycol, diethylene glycol, propylene glycol, butylene glycol, triethylene glycol, 1,5-pentane diol, 1,2-hexane diol, 1,2,6-hexane triol, glycerin, trimethylol propane, and sugar alcohols such as xylitol; and saccharides such as xylose, glucose, and galactose.

Specific examples of the polyhydric alcohol derivative include ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, dipropylene glycol monobutyl ether, and the ethylene oxide adduct of diglycerin.

Specific examples of the nitrogen-containing solvent include pyrrolidone, N-methyl-2-pyrrolidone, cyclohexyl pyrrolidone, triethanol amine. Specific examples of the alcohols include ethanol, isopropyl alcohol, butyl alcohol, and benzyl alcohol.

Specific examples of the sulfur-containing solvent include thiodiethanol, thiodiglycerol, sulfolane, and dimethyl sulfoxide.

It is also possible to use propylene carbonate, ethylene carbonate, or the like as a water-soluble solvent.

At least one kind of water-soluble solvent may be used. The content of the water-soluble solvent to be used may be from 1% by weight to 70% by weight.

Next, water will be described. As the water, in order to prevent introduction of impurities, ion exchange water, ultra pure water, distilled water or ultrafiltrated water may be used.

Next, other additives will be described. A surfactant may be added to the ink.

As the kinds of the surfactants, various kinds of anionic surfactants, nonionic surfactants, cationic surfactants, and amphoteric surfactants, or the like are exemplified. Specifically, the anionic surfactants and the nonionic surfactants may be used.

Hereinafter, specific examples of the surfactant will be listed. Examples of the anionic surfactant to be used include alkylbenzenesulfonic acid salt, alkylphenylsulfonic acid salt, alkylnaphthalenesulfonic acid salt, higher fatty acid salt, sulfuric acid ester salt of higher fatty acid ester, sulfonic acid salt of higher fatty acid ester, sulfuric acid ester salt and sulfonic acid salt of higher alcohol ether, higher alkylsulfosuccinic acid salt, polyoxyethylenealkyl ethercarboxylic acid salt, polyoxyethylenealkyl ethersulfuric acid salt, alkylphosphoric acid salt and polyoxyethylenealkyl etherphosphoric acid salt, or dodecylbenzenesulfonic acid salt, isopropylnaphthalenesulfonic acid salt, monobutylphenylphenol monosulfonic acid salt, monobutylbiphenylsulfonic acid salt, monobutylbiphenylsulfonic acid salt and dibutylphenylphenoldisulfonic acid salt.

Examples of the nonionic surfactant to be used include polyoxyethylene alkyl ether, polyoxyethylene alkylphenyl ether, polyoxyethylene fatty acid ester, sorbitan fatty acid ester, polyoxyethylene sorbitan fatty acid ester, polyoxyethylene sorbitol fatty acid ester, glycerine fatty acid ester, polyoxyethyleneglycerine fatty acid ester, polyglycerine fatty acid ester, sucrose fatty acid ester, polyoxyethylenealkylamine, polyoxyethylene fatty acid amide, alkylalkanol amide, polyethyleneglycol polypropyleneglycol block copolymer, acetylene glycol, and polyoxyethylene adduct of acetylene glycol, or polyoxyethylene nonyl phenyl ether, polyoxyethylene octyl phenyl ether, polyoxyethylene dodecyl phenyl ether, polyoxyethylene alkyl ether, polyoxyethylene fatty acid ester, sorbitan fatty acid ester, polyoxyethylene sorbitan fatty acid ester, fatty acid alkylol amide, polyethyleneglycol polypropyleneglycol block copolymer, acetylene glycol, and polyoxyethylene adduct of acetylene glycol.

In addition, silicone surfactants such as polysiloxane oxyethylene adduct, fluorine-based surfactants such as perfluoroalkyl carboxylic acid salt, perfluoroalkyl sulfonic acid salt and oxyethylene perfluoroalkyl ether, and biosurfactants such as spiculisporic acid, rhamnolipid and lysolecithin may also be used.

These surfactants may be used solely or as a mixture. The HLB (hydrophilic-lipophilic balance) of the surfactant may be in the range of from 3 to 20 in view of dissolving stability, or the like.

The amount of the surfactant to be added is, for example, from 0.001% by weight to 5% by weight, or from 0.01% by weight to 3% by weight.

Furthermore, various additives may be added to the ink, such as a penetrating agent, or polyethylene imine, polyamines, polyvinyl pyrrolidone, polyethylene glycol, ethyl cellulose, and carboxy methyl cellulose, in order to adjust the penetrability, or in order to control the ink ejection property, and compounds of alkali metals such as potassium hydroxide, sodium hydroxide and lithium hydroxide for adjusting the conductivity and the pH. As needed, a pH buffer, an antioxidant, a fungicide, a viscosity adjusting agent, a conductive agent, an ultraviolet ray absorbing agent, a chelating agent, or the like may be added as well.

Specific characteristics of the ink will be described. First of all, the pH of the ink maybe 7 or more, or 7 to 11, or from 8 to 10.

Here, as the pH of ink, the value measured under the conditions of 23±0.5° C., and 55±5% R.H. by the use of a pH/conductivity meter (trade name: MPC227, manufactured by Mettler Toledo) is used.

The surface tension of the ink may be from 20 mN/m to 45 mN/m (or from 25 mN/m to 38 mN/m).

Here, as the surface tension, the value measured under the conditions of 23° C., and 55% RH by the use of the WILL-HERMY type surface tension meter (manufactured by Kyowa Interface Science Co., Ltd.) is used.

The ink composition is not particularly limited to the above, and may include other functional materials such as a crystal material and electronic material, as well as the colorant.

Second Exemplary Embodiment: Recording Apparatus

Next, a recording apparatus according to the second exemplary embodiment will be explained.

The recording apparatus according to the second exemplary embodiment is a recording apparatus (recording method) using the ink receiving particles and the ink according to the first exemplary embodiment, which includes an intermediate transfer body; a supply unit (supply step) that supplies the ink receiving particles onto the intermediate transfer body; an ink ejecting unit (ink ejecting step) that ejects the ink onto the ink receiving particles supplied onto the intermediate transfer body; a transfer unit (transfer step) that transfers the ink receiving particles onto a recording medium; and a fixing unit (fixing step) that fixes the ink receiving particles transferred onto the recording medium, wherein the ink receiving particle is supplied onto the intermediate transfer body and receive the ink ejected from the ink ejecting unit.

Specifically, for example, from the supply unit, the ink receiving particles are supplied on an intermediate body (intermediate transfer body) in a layer form. On the supplied layer of ink receiving particles (that is, ink receiving particle layer), ink is ejected from the ink ejecting unit to be received. The ink receiving particle layer having received the ink is transferred from the intermediate body onto a recording medium by the transfer unit. Entire area of the ink receiving particle layer may be transferred, or only a selected recording area (ink receiving area) may be transferred. Then, the ink receiving particle layer transferred on the recording medium is pressurized (or heated and pressurized) and fixed by the fixing means. Thus, the image is recorded by the ink receiving particles having received the ink. Transfer and fixing may be performed either simultaneously or separately.

In order to receive the ink, the ink receiving particles are formed, for example, in a layer shape, and the thickness of the ink receiving particle layer may be 1 μm to 100 μm, or from 3 μm to 60 μm, or from 5 μm to 30 μm. The porosity of the ink receiving particle layer (that is, porosity of gaps between ink receiving particles+porosity of gaps in ink receiving particles (trap structure)) may be from 10% to 80%, or from 30% to 70%, or from 40% to 60%.

On the surface of the intermediate body, a releasing agent may be applied preliminarily before supply of the ink receiving particles. Examples of such a releasing agent include (modified) silicone oil, fluorine oil, hydrocarbon oil, mineral oil, vegetable oil, polyalkylene glycol, alkylene glycol ether, alkane diol, fused wax, and the like.

The recording medium may be either permeable medium (e.g. plain paper or coated paper) or impermeable medium (e.g. art paper or resin film). The recording medium is not limited to these, and examples include semiconductor substrate and other industrial products.

The recording apparatus (recording method) in the second exemplary embodiment may include a supply unit that supplies the ink receiving particle onto a recording medium, an ink ejecting unit that ejects an ink onto the ink receiving particle supplied onto the recording medium, and a fixing unit that fixes the ink receiving particle supplied on the recording medium, where the ink receiving particle is supplied onto the recording medium and receive the ink ejected from the ink ejecting unit.

Specifically, first of all, from the supply unit, the ink receiving particle is supplied onto the recording medium in a layer form. On the supplied layer of ink receiving particles (that is, ink receiving particle layer), ink is ejected from the ink ejecting unit to be received. The ink receiving particle layer having received the ink is pressurized (or heated and pressurized) and fixed by the fixing means. Thus, the image is recorded by the ink receiving particle having received the ink. Thus, the ink receiving particles may be supplied directly on the recording medium.

Hereinbelow, the recording apparatus according to the second exemplary embodiment will be described with reference to drawings. The same symbol is given to the member which has the same effect and function, and the overlapped description is not repeated here in some cases.

Figure 3:
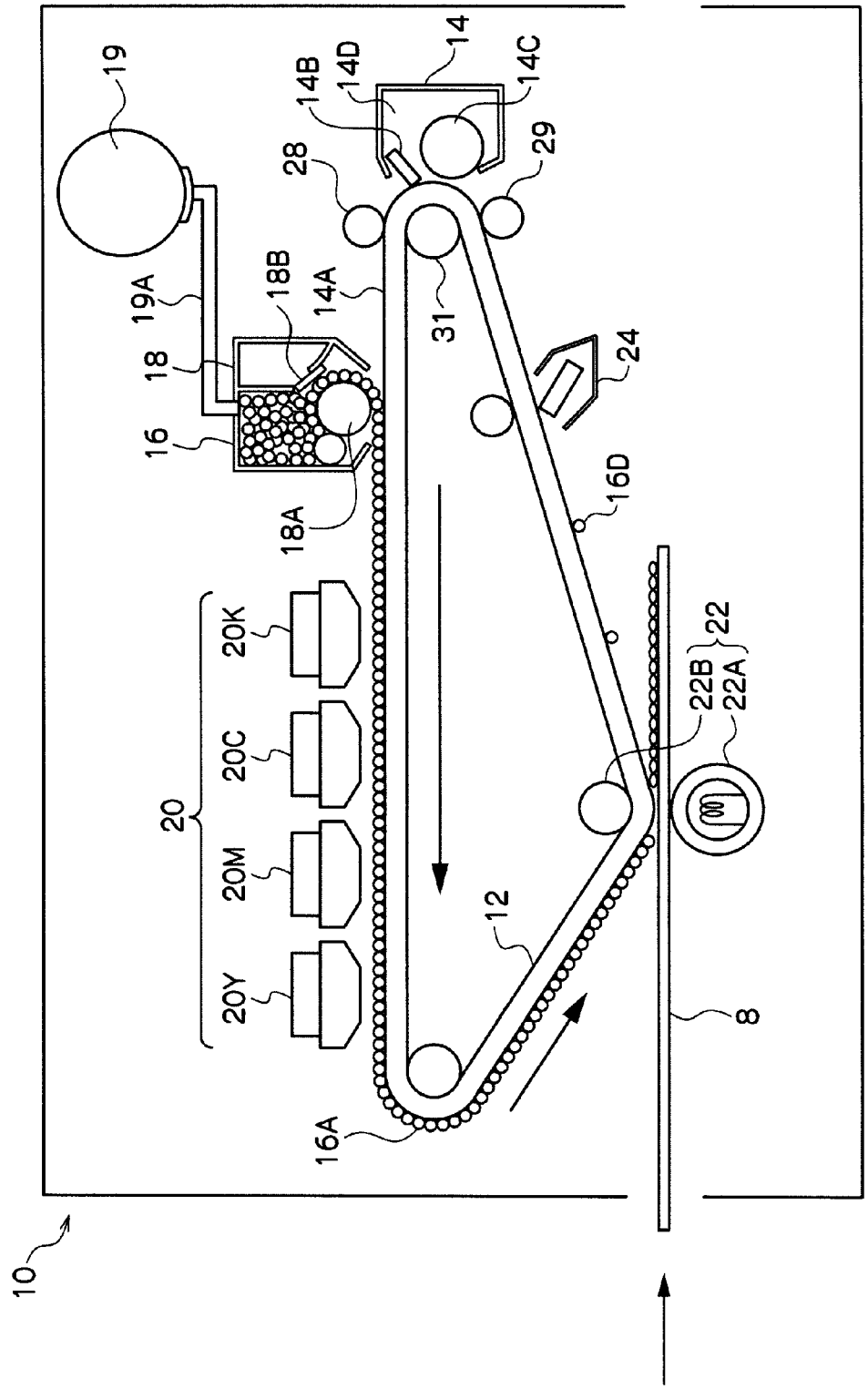
FIG. 3 is a schematic diagram showing a recording apparatus according to an exemplary embodiment.
Figure 4:
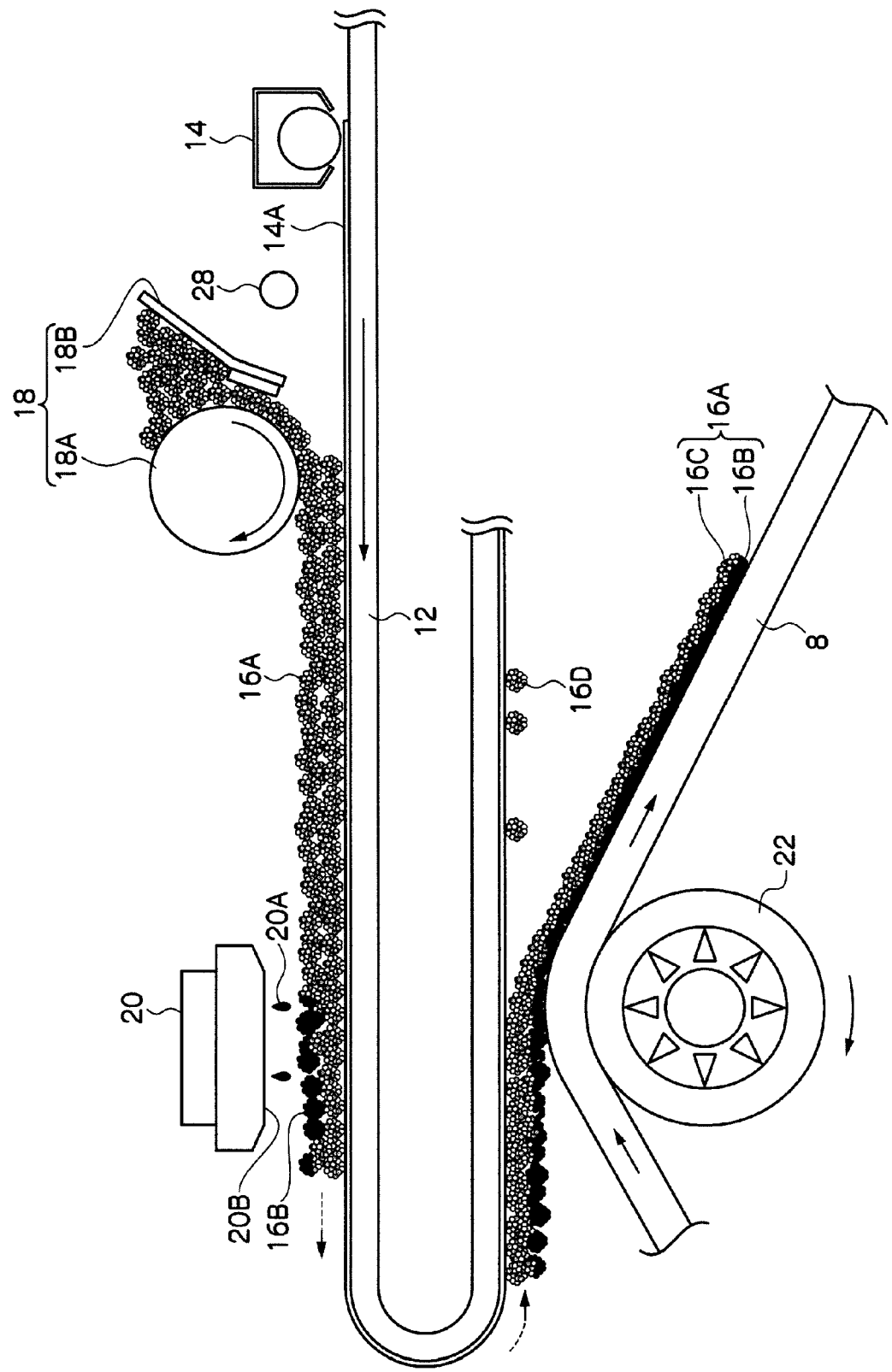
FIG. 4 is a schematic diagram showing a major portion of the recording apparatus according to an exemplary embodiment.

FIG. 3 is a schematic diagram showing a recording apparatus according to the exemplary embodiment. FIG. 4 is a schematic diagram showing a major portion of the recording apparatus according to the exemplary embodiment. FIGS. 5A and 5B are schematic diagrams showing the ink receiving particle layer according to the exemplary embodiment. In exemplary embodiment below, the case where composite particles are applied as the ink receiving particles which will be described later is explained.

As shown in FIGS. 3 and 4, a recording apparatus 10 in the exemplary embodiment includes an endless belt-shaped intermediate transfer body 12, a charging device 28 for charging the surface of the intermediate transfer body 12, a particle supplying device 18 for forming a particle layer by supplying ink receiving particles 16 onto a charged region on the intermediate transfer body 12, an inkjet recording head 20 for forming an image by ejecting ink droplets onto the particle layer, and a transfer fixing device 22 for transferring and fixing an ink receiving particle layer on a recording medium 8 by overlapping the intermediate transfer body 12 with the recording medium 8 and by applying pressure and heat. An ink receiving particle storage cartridge 19 is detachably coupled to the particle supplying device 18 with a supply tube 19A provided therebetween.

At the upstream side of the charging device 28, a releasing agent supplying device 14 is disposed for forming a releasing layer 14A by supplying a releasing agent 14D.

An electric charge is formed on the surface of the intermediate transfer body 12 by the charging device 28, and an ink receiving particle layer 16A is formed by the particle supplying device 18. On the particle layer, ink droplets in each color are ejected from inkjet recording heads 20 of individual colors, that is, 20K, 20C, 20M, 20Y, and a color image is formed.

The ink receiving particle layer on which the color image is formed is transferred onto the recording medium 8 by the transfer fixing device (transfer fixing roll) 22. At the downstream side of the transfer fixing device 22, a cleaning device 24 is disposed for removing deposits sticking onto the intermediate transfer body such as the ink receiving particles 16 remained on the surface of the intermediate transfer body 12, and foreign matter (paper dust of recording medium 8 or the like) other than the particles.

The recording medium 8 on which the color image is transferred is directly conveyed out, and the surface of the intermediate transfer body 12 is charged again by the charging device 28. At this time, the ink receiving particles transferred onto the recording medium 8 absorb and hold the ink droplets 20A, and may be quickly conveyed.

As required, a charge eraser 29 may be installed between the cleaning device 24 and the releasing agent supplying device 14 (unless otherwise specified, the term "a region between A and B" indicates a region that includes neither A nor B) in order to remove the residual electric charge on the surface of the intermediate transfer body 12.

In the exemplary embodiment, the intermediate transfer body 12 is composed of a base layer of polyimide film of 1 mm in thickness, on which a surface layer of ethylene propylene diene monomer (EPDM) rubber of 400 µm in thickness is formed. Herein, the surface resistivity may be approximately $10^{13}$ Ω/sq., and the volume resistivity may be approximately $10^{12}$ Ω·cm (semi-conductivity).

The intermediate transfer body 12 is moved (revolved), and a releasing layer 14A is formed on the surface of the intermediate transfer body 12 by the releasing agent supplying device 14. A releasing agent 14D is applied on the surface of the intermediate transfer body 12 by a supply roll 14C of the releasing agent supplying device 14, and the layer thickness is regulated by a blade 14B.

At this time, in order to form an image and print continuously, the releasing agent supplying device 14 may continuously contact with the intermediate transfer body 12, or may be separated from the intermediate transfer body 12.

From an independent liquid supply system (not shown), the releasing agent 14D may be supplied into the releasing agent supplying device 14, so that the supply of the releasing agent 14D is not interrupted.

By applying a positive charge onto the surface of the intermediate transfer body 12 by the charging device 28, the surface of the intermediate transfer body 12 is positively charged. A potential capable of supplying and adsorbing the ink receiving particles 16 onto the surface of the intermediate transfer body 12 may be formed by an electrostatic force of an electric field which may be formed between the supply roll 18A of the ink receiving particle supplying device 18 and the surface of the intermediate transfer body 12.

In the exemplary embodiment, using the charging device 28, a voltage is applied between the charging device 28 and a driven roll 31 (connected to ground), between which the intermediate transfer body 12 is disposed, and the surface of the intermediate transfer body 12 is charged.

The charging device 28 is a roll shape member adjusted to have a volume resistivity of from $10^6$ Ω·cm to $10^8$ Ω·cm which has an elastic layer (foamed urethane resin) with a dispersed conductive material on the outer circumference of a stainless steel bar material. The surface of the elastic layer is coated with a coating layer (e.g. tetrafluoroethylene-perfluoroalkylvinyl ether copolymer (PFA)) of water-repellent and oil-repellent property of from 5 µm to 100 µm in thickness.

A DC power source is connected to the charging device 28, and the driven roll 31 is electrically connected to the frame ground. The charging device 28 is driven together with the driven roll 31, while the intermediate transfer body 12 is disposed between the charging device 28 and the driven roll 31. At the pressed position, since a specified potential difference occurs between the grounded driven roll 31 and the charging device 28, an electric charge may be applied onto the surface of the intermediate transfer body 12. Here, a voltage of 1 kV is applied onto the surface of the intermediate transfer body 12 by the charging device 28, and the surface of the intermediate transfer body 12 is charged.

The charging device 28 may be composed of corotron and the like.

The ink receiving particles 16 are supplied from the particle supplying device 18 onto the surface of the intermediate transfer body 12, and an ink receiving particle layer 16A is formed. The particle supplying device 18 has an ink receiving particle supply roll 18A in the portion facing the intermediate transfer body 12 in the container containing the ink receiving particles 16, and a charging blade 18B is disposed so as to press the ink receiving particle supply roll 18A. The charging blade 18B also functions to regulate the film thickness of the ink receiving particles 16 supplied and adhered onto the surface of the ink receiving particle supply roll 18A.

The ink receiving particles 16 are supplied by the ink receiving particle supply roll 18A (conductive roll), and the ink receiving particle layer 16A is regulated by the charging blade 18B (conductive blade), and is charged negatively with the reverse polarity of the electric charge on the surface of the intermediate transfer body 12. The supply roll 18A may be an aluminum solid roll, and the charging blade 18B may be made of metal plates (such as SUS) being coated with urethane rubber in order to apply pressure. The charging blade 18B is contacting with the supply roll 18A in a manner of doctor blades.

The charged ink receiving particles 16 form, for example, one layer of particles on the surface of the ink receiving particle supply roll 18A, and are conveyed to a position opposite to the surface of the intermediate transfer body 12. When coming close to the intermediate transfer body 12, the charged ink receiving particles 16 are moved electrostatically onto the surface of the intermediate transfer body 12 by the electric field formed by the potential difference from the surface of the intermediate transfer body 12.

At this time, the ratio (peripheral speed ratio) of moving speed of the intermediate transfer body 12 and rotating speed of the supply roll 18A is determined so that one layer of particles is formed on the surface of the intermediate transfer body 12. This peripheral speed ratio depends on the charging amount of the intermediate transfer body 12, charging amount of the ink receiving particles 16, relative position of the supply roll 18A and the intermediate transfer body 12, and other parameters.

On the basis of the peripheral speed ratio for forming one layer of the ink receiving particle layer 16A, when the peripheral speed of the supply roll 18A is relatively accelerated, the number of particles supplied on the intermediate transfer body 12 may be increased. For example, when the transferred image density is low (an amount of the applied ink is small, e.g. 0.1 g/m² to 1.5 g/m²), the layer thickness is regulated to a minimally required limit (e.g. 1 µm to 5 µm), and when the image density is high (an amount of the applied ink is large, e.g. 4 g/m² to 15 g/m²), the layer thickness is regulated to a sufficient layer thickness (e.g. 10 μm to 25 μm) for holding the ink liquid component (solvent or dispersion medium).

For example, in the case of a character image at which an amount of the applied ink is small, when forming an image on one ink receiving particle layer on the intermediate transfer body, the image forming material (pigment) in the ink is trapped on the surface of the ink receiving particle layer on the intermediate transfer body, and is fixed on the surface of the ink receiving particles and in the gaps of the particles, so that the distribution is smaller in the depth direction.

For example, when it is desired to form a particle layer 16C to be a protective layer on an image layer 16B to be a final image (see FIG. 5A), the ink receiving particle layer 16A is formed so as to have a thickness of substantially three layers, and the ink image is formed on the highest layer only, so that the remaining two layers not including an image may be on the image layer 16B as protective layers after transferring and fixing (see FIG. 5B).

Alternatively, when forming an image in two or more colors, that is, an image at which an amount of the applied ink is large, the ink receiving particles 16 are layered to have sufficient number of the particles so that the ink liquid component (solvent or dispersion medium) is held, a colorant (e.g. pigment) is trapped and does not reach the lowest layer. In this case, the image forming material (pigment) is not exposed on the image layer surface after transferring and fixing, and the ink receiving particles 16 not including an image are a protective layer on the image surface.

Next, the inkjet recording head 20 applies ink droplets 20A to the ink receiving particle layer 16A. Based on the specified image information, the inkjet recording head 20 applies the ink droplets 20A to specified positions.

Finally, by nipping the recording medium 8 and the intermediate transfer body 12 by the transfer fixing device 22, and applying pressure and heat to the ink receiving particle layer 16A, the ink receiving particle layer 16A is transferred onto the recording medium 8.

The transfer fixing device 22 is composed of a heating roll 22A incorporating a heating source, and a pressurizing roll 22B, between which the intermediate transfer body 12 is disposed and which are opposite to each other, and the heating roll 22A and pressurizing roll 22B contact each other to form a contact region. The heating roll 22A and pressurizing roll 22B are formed of an aluminum core, coated with silicone rubber on the outer surface, and are further covered with a PFA tube.

In the contact region of the heating roll 22A and pressurizing roll 22B, the ink receiving particle layer 16A is heated by the heater and is pressurized, and hence the ink receiving particle layer 16A is fixed simultaneously when transferred onto the recording medium 8.

At this time, resin particles included in the ink receiving particles 16 in a non-image portion are heated above the glass transition temperature (Tg), and are softened (or melted), and the ink receiving particle layer 16A is released from the releasing layer 14A formed on the surface of the intermediate transfer body 12 by the pressure, and is transferred and fixed on the recording medium 8. Then, the ink receiving particle layer 16A is released from the releasing layer 14A formed on the surface of the intermediate transfer body 12 by the pressure, and is transferred and fixed onto the recording medium 8. At this time, transfer fixing property is improved by heating. In this embodiment, the surface of the heating roll 22A is controlled at 160° C. At this time, the ink liquid component (solvent or dispersion medium) held in the ink receiving particle layer 16A is held in the same ink receiving particle layer 16A even after transfer, and is fixed. Before the process by the transfer fixing device 22, preheating of the intermediate transfer body 12 may be carried out.

The recording medium 8 may be either permeable medium (e.g. plain paper or inkjet coated paper) or impermeable medium (e.g. art paper or resin film). The recording medium is not limited to these, and examples may include semiconductor substrate and other industrial products.

Hereinafter, the image forming process of a recording apparatus in the exemplary embodiment will be described in detail. In the recording apparatus in the exemplary embodiment, as shown in FIG. 4, on the surface of the intermediate transfer body 12, a releasing layer 14A is formed by a releasing layer supplying device 14. If the material of the intermediate transfer body 12 is aluminum or PET base, the effect of the releasing layer 14A may be large. Alternatively, by using the material such as fluororesin or silicone rubber, the surface of the intermediate transfer body 12 may be provided with releasing property.

Next, the surface of the intermediate transfer body 12 is charged with the reverse polarity of the ink receiving particles 16 by the charging device 28. As a result, the ink receiving particles 16 supplied by the supply roll 18A of the particle supplying device 18 may be adsorbed electrostatically, and a layer of the ink receiving particles 16 may be formed on the surface of the intermediate transfer body 12.

Further, on the surface of the intermediate transfer body 12, ink receiving particles 16 are formed as a layer by the supply roll 18A of the particle supplying device 18. For example, the ink receiving particle layer 16A is formed such that a thickness thereof corresponds to substantially three layers of the ink receiving particles 16. That is, the ink receiving particle layer 16A is regulated to a desired thickness by the gap between the charging blade 18B and the supply roll 18A, and thus, the thickness of the ink receiving particle layer 16A transferred on the recording medium 8 is regulated. Alternatively, it may be regulated by the peripheral speed ratio of the supply roll 18A and the intermediate transfer body 12.

On the formed ink receiving particle layer 16A, ink droplets 20A are ejected from inkjet recording heads 20 of individual colors driven by piezoelectric or thermal systems, and an image layer 16B is formed on the ink receiving particle layer 16A. The ink droplets 20A ejected from the inkjet recording head 20 are applied to the ink receiving particle layer 16A, and a liquid component of the ink is promptly absorbed by gaps between the ink receiving particles 16 and the gaps between particles forming the ink receiving particles 16, and a colorant (e.g. pigment) is trapped on the surface of (the particles forming) the ink receiving particles 16 or the gaps between particles forming the ink receiving particles 16.

At this time, the ink liquid component (solvent or dispersion medium) which is contained in the ink droplets 20A permeates into the ink receiving particle layer 16A, however the colorant such as pigment is trapped on the surface of the ink receiving particle layer 16A or the gaps between particles. That is, the ink liquid component (solvent or dispersion medium) may permeate to the back side of the ink receiving particle layer 16A, however the colorant, such as pigment, does not permeate to the back side of the ink receiving particle layer 16A. Hence, when transferred onto the recording medium 8, the particle layer 16C not permeated with the colorant, such as pigment, forms a layer on the image layer 16B. As a result, this particle layer 16C becomes a protective layer for sealing the surface of the image layer 16B, and an image in which the colorant (or example, a colorant such as pigment) is not exposed on the surface may be formed.

Next, by transferring and/or fixing the ink receiving particle layer 16A on which the image layer 16B is formed onto the recording medium 8 from the intermediate transfer body 12, a color image is formed on the recording medium 8. The ink receiving particle layer 16A on the intermediate transfer body 12 is heated and pressurized by the transfer fixing device (transfer fixing roll) 22 heated by heating means such as a heater, and transferred onto the recording medium 8.

At this time, by adjusting heating and pressurizing as mentioned below, the roughness of the image surface may be properly adjusted, and the degree of gloss may be controlled. Alternatively, the degree of gloss may be controlled by cooling and peeling off.

After removing the ink receiving particle layer 16A, residual particles 16D remaining on the surface of the intermediate transfer body 12 are collected by the cleaning device 24 (see FIG. 3), and the surface of the intermediate transfer body 12 is charged again by the charging device 28, and the ink receiving particles 16 are supplied to form the ink receiving particle layer 16A.

FIGS. 5A and 5B show particle layers used in the recording apparatus of the second exemplary embodiment. As shown in FIG. 5A, on the surface of the intermediate transfer body 12, a releasing layer 14A is formed.

Next, on the surface of the intermediate transfer body 12, a layer of the ink receiving particles 16 is formed by the particle supplying device 18. The ink receiving particle layer 16A formed as mentioned above may be formed such that a thickness thereof corresponds to substantially three layers of the ink receiving particles 16. By regulating the ink receiving particle layer 16A to a desired thickness, the thickness of the ink receiving particle layer 16A transferred onto the recording medium 8 is controlled. At this time, the surface of the ink receiving particle layer 16A is uniformly formed so as not to disturb image forming (forming of image layer 16B) by ejection of ink droplets 20A.

The colorant such as pigment contained in the ejected ink droplets 20A permeates into substantially one third or more but half or less of the ink receiving particle layer 16A as shown in FIG. 5A, and a particle layer 16C into which colorant such as pigment has not permeated is remaining beneath it.

When the ink receiving particle layer 16A is formed on the recording medium 8 by heating, pressurizing and transferring using the transfer fixing device (transfer fixing roll) 22, as shown in FIG. 5B, a particle layer 16C not containing ink is present on the image layer 16B, and the layer functions as a protective layer for the ink image layer 16B. Accordingly, the ink receiving particles 16, at least after fixing, should be transparent in this case.

The particle layer 16C is heated and pressurized by the transfer fixing device (transfer fixing roll) 22, and thus its surface may be made smooth, and the degree of gloss of the image surface may be controlled by heating and pressurizing.

Further, drying of the ink liquid component (solvent or dispersion medium) trapped inside the ink receiving particles 16 may be promoted by heating.

The ink liquid component (solvent or dispersion medium) which is received and held in the ink receiving particle layer 16A is also held in the ink receiving particle layer 16A after transferring and fixing, and is removed by natural drying.

Through the above process, the image forming is completed. If residual particles 16D remaining on the intermediate transfer body 12 or foreign matter such as paper dust separated from the recording medium 8 are present after transfer of the ink receiving particles 16 onto the recording medium 8, they may be removed by the cleaning device 24.

Further, the charge eraser 29 may be disposed at the downstream side of the cleaning device 24. For example, using a conductive roll as the charge eraser 29, a voltage of approximately ±3 kV, 500 Hz is applied to the surface of the intermediate transfer body 12 between the conductive roll and a driven roll 31 (grounded), and the surface charge of the intermediate transfer body 12 may be erased.

The charging voltage, particle layer thickness, fixing temperature and other mechanical conditions are determined in optimum conditions depending on the composition of the ink receiving particles 16 or ink, ink ejection volume, and the like.

<Constituent Elements>

Constituent elements in the respective steps in the exemplary embodiment will be specifically described below.

<Intermediate Transfer Body>

The intermediate transfer body 12 on which the ink receiving particle layer is to be formed may be either belt or cylindrical (drum) as the exemplary embodiment. To supply and hold ink receiving particles on the surface of the intermediate transfer body by an electrostatic force, the outer circumferential surface of the intermediate transfer body should have semiconductive or insulating properties for particle holding property. As to electric characteristics for the surface of the intermediate transfer body, a material having surface resistance of from $10^{10}$ Ω/sq. to less than $10^{14}$ Ω/sq. and volume resistivity of from $10^9$ Ω·cm to less than $10^{13}$ Ω·cm may be used in the case of the semiconductive property, and a material having surface resistance of $10^{14}$ Ω/sq. or more and volume resistivity of $10^{13}$ Ω·cm or more may be used in the case of the insulating property.

In the case of belt shape, the base material is not particularly limited as long as it is capable of rotating and driving the belt in the apparatus and has sufficient mechanical strength, and it has sufficient heat resistance when heat is used in transfer/fixing. Specific examples of the base material are polyimide, polyamide imide, aramid resin, polyethylene terephthalate, polyester, polyether sulfone, and stainless steel.

In the case of drum shape, the base material may be aluminum, stainless steel or the like.

In order to apply heating system by electromagnetic induction in the fixing process in the transfer fixing device (transfer fixing roll) 22, a heat generating layer may be formed on the intermediate transfer body 12, not on the transfer fixing device 22. The heat generating layer is made of a metal causing electromagnetic induction action. For example, nickel, iron, copper, aluminum or chromium may be used selectively.

<Particle Supply Process>

Before supplying the ink receiving particles 16, a releasing agent 14D is applied on the surface of the intermediate transfer body 12 to form a releasing layer 14A using the releasing agent supplying device 14.

The method of supplying the releasing layer 14A may be a method that involves processes of containing the releasing agent 14D, supplying the releasing agent 14D to a releasing agent supply member, and forming the releasing layer 14A by supplying the releasing agent 14D to the surface of the intermediate transfer body 12 by the supply member, or a method that involves a process of forming the releasing layer 14A on the surface of the intermediate transfer body 12 by the supply member that is impregnated with the releasing agent 14D.

Examples of the releasing agent 14D include releasing materials such as silicone oil, fluorine oil, poly alkylene glycol, and surfactants.

Examples of the silicone oil include straight silicone oil, modified silicone oil. Examples of the straight silicone oil include dimethyl silicone oil and methyl hydrogen silicone oil. Examples of the modified silicone oil include methyl styryl-modified oil, alkyl-modified oil, higher fatty acid ester-modified oil, fluorine-modified oil, amino-modified silicone oil.

Examples of the poly alkylene glycol include polyethylene glycol, polypropylene glycol, ethyleneoxide/propylene oxide copolymer, and polybutylene glycol. Among them, polypropylene glycol may be used.

Examples of the surfactant include anionic surfactants, cationic surfactants, amphoteric surfactants, and nonionic surfactants. Among them, the nonionic surfactant may be used.

The viscosity of the releasing agent 14D may be from 5 mPa·s to 200 mPa·s, or from 5 mPa·s to 100 mPa·s, or from 5 mPa·s to 50 mPa·s.

The measurement of viscosity is performed as follows. The viscosity is measured by using RHEOMAT 115 (manufactured by Contraves). A sample is placed into a measuring vessel and the vessel is installed in an apparatus by a predetermined method and then the measurement is carried out at 40° C. at shear rate of $1400\ s^{-1}$.

The surface tension of the releasing agent 14D may be 40 mN/m or less (or 30 mN/m or less, or 25 mN/m or less).

The measurement of surface tension is performed as follows. As the surface tension, the value measured under the conditions of 23±0.5° C., 55±5% RH by the use of the WILL-HERMY type surface tension meter (manufactured by Kyowa Interface Science Co., Ltd.) is used.

The boiling point of the releasing agent 14D is, for example, in the range of 250° C. or more (or 300° C. or more, or 350° C. or more) under 760 mmHg.

Measurement of the boiling point is performed as follows. It is measured in accordance with JIS K2254 (the disclosure of which is incorporated by reference herein) and an initial boiling point is used as the boiling point.

Next, the surface of the intermediate transfer body 12 is charged with the reverse polarity of the ink receiving particles 16 by the charging device 28. Then, the ink receiving particle layer 16A is formed on the charged surface of the intermediate transfer body 12. At this time, as the method of forming the ink receiving particle layer 16A, a general method of supplying an electrophotographic toner on a photoreceptor may be applied. That is, a charge is supplied in advance on the surface of the intermediate transfer body 12 by general charging method for electrophotography (charging by the charging device 28 or the like). The ink receiving particles 16 are frictionally charged so as to have a counter charge to the charge of the surface of the intermediate transfer body 12.

The ink receiving particles 16 held on the supply roll 18A form an electric field together with the surface of the intermediate transfer body 12, and are moved/supplied onto the intermediate transfer body 12 and held thereon by an electrostatic force. At this time, in accordance with the thickness of the image layer 16B to be formed in the ink receiving particle layer 16A (depending on an amount of the ink to be applied), the thickness of the ink receiving particle layer 16A may be also controlled. In this case, the absolute value of the charging amount of ink receiving particles 16 may be in the range of from 5 μC/g to 50 μC/g.

Here, the thickness of the ink receiving particle layer 16A may be from 1 μm to 100 μm, or from 1 μm to 50 μm, or from 5 μm to 25 μm. The porosity of the ink receiving particle layer (that is, porosity of gaps between ink receiving particles+ porosity of gaps in ink receiving particles (trap structure)) may be from 10% to 80%, or from 30% to 70%, or from 40% to 60%.

A particle supply process corresponding to single-component supply (development) system will be explained below.

The ink receiving particles 16 are supplied on a supply roll 18A, and charged by a charging blade 18B while the thickness of the particle layer is regulated.

The charging blade 18B has a function of regulating the layer thickness of the ink receiving particles 16 on the surface of the supply roll 18A, and may change the layer thickness of the ink receiving particles 16 on the surface of the supply roll 18A by varying the pressure onto the supply roll 18A. By controlling the layer thickness of the ink receiving particles 16 on the surface of the supply roll 18A to one layer, the layer thickness of the ink receiving particles 16 formed on the surface of the intermediate transfer body 12 may be formed in substantially one layer. Alternatively, by controlling the pressing force of the charging blade 18B to be low, the layer thickness of the ink receiving particles 16 formed on the surface of the supply roll 18A may be increased, and the thickness of the ink receiving particle layer 16A of the ink receiving particles 16 formed on the surface of the intermediate transfer body 12 may be increased.

In other methods, when the peripheral speed of the intermediate transfer body 12 and the supply roll 18A forming one particle layer on the surface of the intermediate transfer body 12 is 1, by increasing the peripheral speed of the supply roll 18A, the number of ink receiving particles 16 supplied on the intermediate transfer body 12 may be increased, and it may be controlled so as to increase the thickness of the ink receiving particle layer 16A on the intermediate transfer body 12. Further, the layer thickness may be regulated by combining the above methods. In this configuration, for example, the ink receiving particles 16 are charged negatively, and the surface of the intermediate transfer body 12 is charged positively.

By thus controlling the layer thickness of the ink receiving particle layer 16A, consumption of the ink receiving particle layer 16A may be suppressed, and a pattern covered with a protective layer may be formed.

As the charging roll in the charging device 28, it is possible to use a roll of from 10 mm to 25 mm in diameter, having an elastic layer with a dispersed conductive material on the outer surface of bar or pipe member which is made of aluminum, stainless steel or the like, and having volume resistivity adjusted to approximately from $10^6$ Ω·cm to $10^8$ Ω·cm.

The elastic layer may include resin materials such as urethane resin, thermoplastic elastomer, epichlorohydrin rubber, ethylene-propylene-diene copolymer rubber, silicon type rubber, acrylonitrile-butadiene copolymer rubber, or polynorbornene rubber. These resin materials may be used alone or in combination. A specific material may be a foamed urethane resin.

The foamed urethane resin may be a resin having closed cell structure formed by mixing and dispersing a hollow body such as hollow glass beads or microcapsules of thermal expansion type in a urethane resin.

Further, the surface of the elastic layer may be coated with a water repellent coating layer of from 5 μm to 100 μm in thickness.

A DC power source is connected to the charging device 28, and the driven roll 31 is electrically connected to the frame ground. The charging device 28 is driven together with the driven roll 31, while the intermediate transfer body 12 is disposed between the charging device 28 and the driven roll 31, and at the pressed position, a specified potential difference occurs against the grounded driven roll 31.

<Marking Process>

Ink droplets 20A are ejected from the inkjet recording head 20 based on an image signal, on the layer (ink receiving particle layer 16A) of the ink receiving particles 16 formed on the surface of the intermediate transfer body 12, and an image is formed. The ink droplets 20A ejected from the inkjet recording head 20 are applied to the ink receiving particle layer 16A, and the ink droplets 20A are promptly absorbed by gaps between particles formed in the ink receiving particles 16, and a colorant (e.g. pigment) is trapped on the surface of the ink receiving particles 16 or the gaps between particles forming the ink receiving particles 16.

In this case, many colorants (e.g. pigment) may be trapped on the surface of the ink receiving particle layer 16A. This is realized since gaps between particles in the ink receiving particles 16 have filter effects for trapping the colorants (e.g. pigment) on the surface of ink receiving particle layer 16A as well as trapping and fixing the colorants in the gaps between particles in the ink receiving particles 16.

To securely trap the colorant (e.g. pigment) on the surface of the ink receiving particle layer 16A and in the gaps between particles in the ink receiving particles 16, the ink may react with the ink receiving particles 16, so that the colorant (e.g. pigment) may be quickly made insoluble (aggregated). Specifically, this reaction may be realized by making use of reaction between ink and polyhydric metal salt, or pH reaction type.

A line type inkjet recording head having a width that is equal to or larger than the recording medium may be used, however by using a conventional scan type inkjet recording head, images may be formed sequentially on the particle layer formed on the intermediate transfer body. The ink ejecting unit of the inkjet recording head 20 is not particularly limited as long as it is capable of ejecting ink, such as piezoelectric element drive type, or heater element drive type.

When the ink receiving particles 16 are allowed to react with the ink, for example, the ink receiving particles 16 are treated with an aqueous solution containing an aggregating agent (e.g. polyvalent metal salt and organic acid) which has effects of aggregating the pigment by reacting with ink, and dried before use.

<Transfer Process>

The ink receiving particle layer 16A in which an image is formed by receiving the ink droplets 20A is transferred and fixed on the recording medium 8, and therefore, an image is formed on the recording medium 8. The transfer and fixing may be done in separate processes. However, the transfer and fixing may be done substantially at the same time. The fixing may be effected by any one of heating or pressing methods of the ink receiving particle layer 16A, or by using both of heating and pressing methods, or by heating and pressing substantially at the same time.

By controlling heating/pressing, the surface properties of the ink receiving particle layer 16A may be controlled, and the degree of gloss may be controlled. After heating/pressing, when peeling the recording medium 8 on which an image (the ink receiving particle layer 16A) is transferred from the intermediate transfer body 12, it may be peeled off after cooling of the ink receiving particle layer 16A. Examples of the cooling method include natural cooling and forced cooling such as air-cooling. In these processes, the intermediate transfer body 12 may be of belt shape.

For example, the ink image is formed on the surface layer in the ink receiving particles 16 formed on the intermediate transfer body 12 (the colorant (pigment) is trapped on the surface of the ink receiving particle layer 16A), and transferred onto the recording medium 8, and therefore the ink image is formed so as to be protected by the particle layer 16C composed of the ink receiving particles 16.

The ink liquid component (solvent or dispersion medium), which is received/held in the layer of the ink receiving particles 16, is held in the layer of the ink receiving particles 16 after transfer and fixing, and removed by natural drying.

<Cleaning Process>

To allow repetitive use by refreshing the surface of the intermediate transfer body 12, a process of cleaning the surface by a cleaning device 24 is needed. The cleaning device 24 includes a cleaning part and a particle conveying recovery part (not shown), and by the cleaning process, the ink receiving particles 16 (residual particles 16D) remaining on the surface of the intermediate transfer body 12, and deposits sticking to the surface of the intermediate transfer body 12 such as excrescence(paper dust of recording medium 8 and others) other than the particles may be removed. The collected residual particles 16D may be recycled.

<Charge Erasing Process>

Before forming the releasing layer 14A, using the charge eraser 29, the surface charge of the intermediate transfer body 12 may be erased.

In the recording apparatus of the above-described exemplary embodiment, a releasing agent 14D is applied on the surface of the intermediate transfer body 12 using the releasing agent supplying device 14 and a releasing layer 14A is formed, and then the surface of the intermediate transfer body is charged by the charging device 28. Next, on the charged region on the releasing layer of the intermediate transfer body 12, ink receiving particles 16 are supplied from the particle supplying device 18, and a particle layer is formed. Then, onto the particle layer, ink droplets are ejected from the inkjet recording head 20 to form an image. Thus, the ink receiving particles 16 receive the ink. After that, by superimposing the recording medium 8 and the intermediate transfer body 12, and applying pressure and heat to them by the transfer fixing device 22, the ink receiving particle layer 16A is transferred and fixed onto the recording medium 8.

In addition, the recording apparatus is not limited to the form of an intermediate transfer system, it may be another form of directly supplying ink receiving particles on a recording medium as described below.

Figure 6:
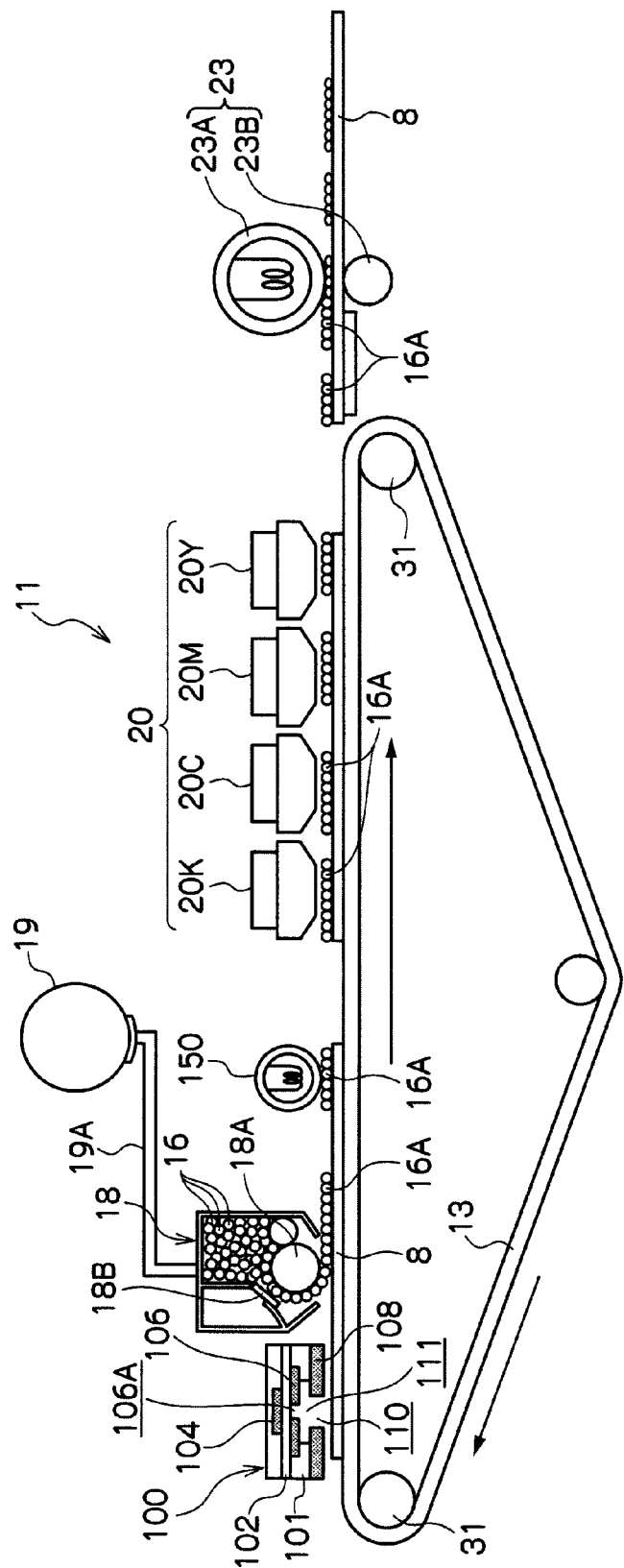
FIG. 6 is a schematic diagram showing the recording apparatus according to another exemplary embodiment.
Figure 7:
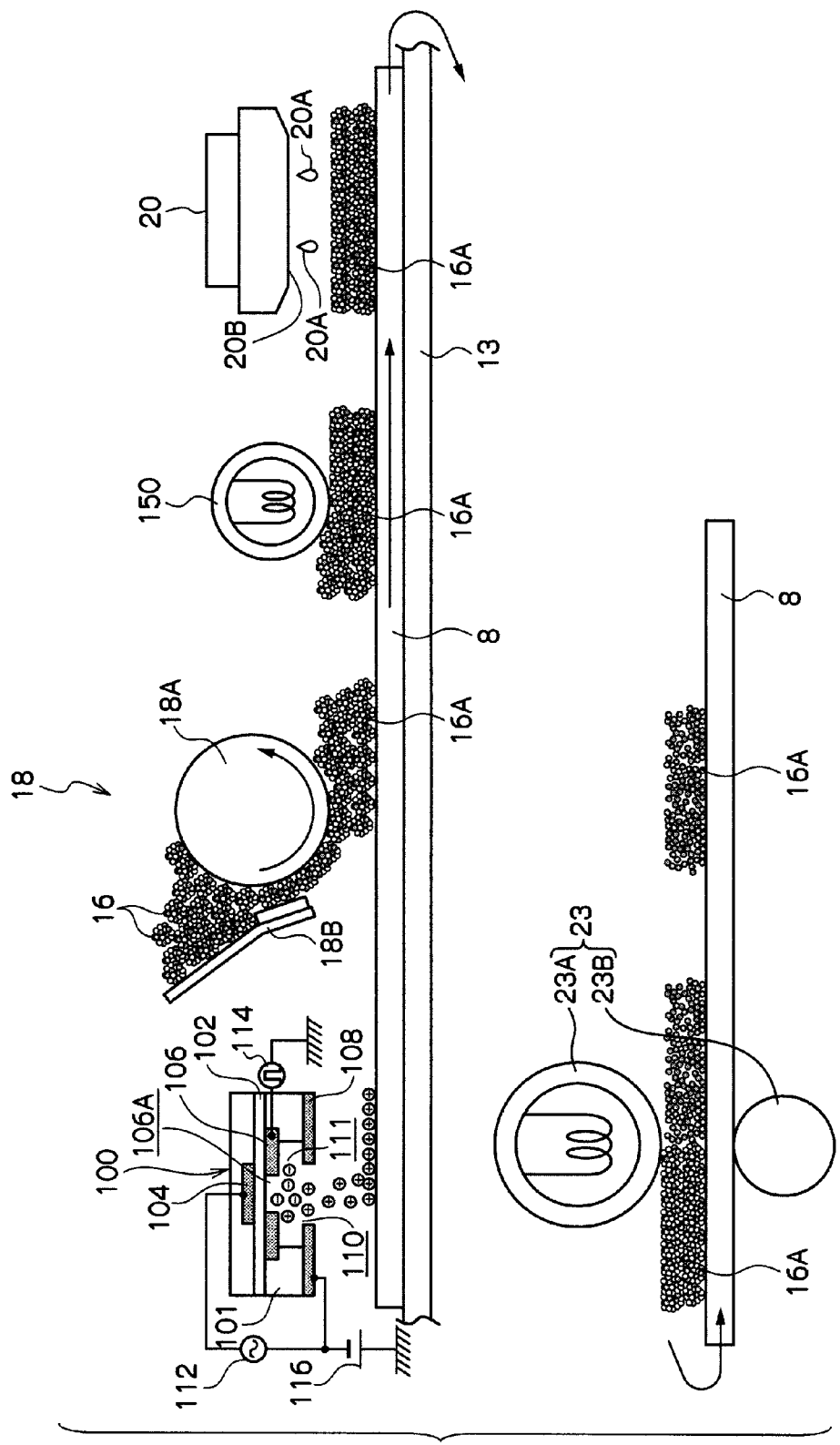
FIG. 7 is a schematic diagram showing a major portion of the recording apparatus according to another exemplary embodiment.

FIG. 6 is a schematic diagram showing the recording apparatus according to another exemplary embodiment. FIG. 7 is a schematic diagram showing a major portion of the recording apparatus according to another exemplary embodiment. In another exemplary embodiment below, the case where composite particles are applied as the ink receiving particles which will be described later is explained.

A recording apparatus 11 in another exemplary embodiment has a transportation belt 13, shaped like an endless belt as shown in FIGS. 6 and 7. The transportation belt 13 is rotationally moved to deliver the recording medium 8 which is sent from a holding container (not shown).

First, an ion current control type electrostatic recording head 100 (hereinafter, abbreviated as "electrostatic recording head 100") controls an ion current generated by discharge and irradiates the recording medium 8 being delivered by the transportation belt 13 with the ion current, which results in the formation of an electrostatic latent image (see FIG 8A).

The electrostatic latent image formed on the recording medium 8 is visualized by the ink receiving particle supplying device 18, and the ink receiving particle layer 16A composed of ink receiving particles 16 is formed (see FIG. 8B).

The ink receiving particle layer 16A formed on the recording medium 8 is preheated and fixed by a pre-fixing device 150.

On the formed ink receiving particle layer 16A which is preheated and fixed, ink droplets 20A in each color (see FIG. 7) are ejected from the inkjet recording heads 20K, 20C, 20M, and 20Y (in each color, that is, in black (K), cyan (C), magenta (M), and yellow (Y) colors) on the basis of image data, and an ink image is formed (See FIG. 8C). Hereafter, Y, M, C, and K are indicated after each symbol when it is necessary to distinguish each color. Unless otherwise distinguished, Y, M, C, and K are not indicated.

The ink receiving particle layer 16A on which the ink image is formed by ejecting the ink droplets 20A is fixed on the recording medium 8 by pressurizing and heating by a fixing device 23.

The electrostatic recording head 100 and inkjet recording head 20 indicate a line type recording head having a width more than the width of the recording medium 8, the so-called FWA (Full Width Array) system.

Next, constituent elements as well as a process of forming an image will be specifically described below.

The recording medium 8 is delivered by the transportation belt 13, shaped like an endless belt. In the exemplary embodiment, the recording medium 8 is transferred in the state adhering to the transportation belt 13.

Here, one example of the method of adsorbing the recording medium 8 to the transportation belt 13 may be a suction mechanism in which a pore (not shown) is provided in the transportation belt 13 and the recording medium is sucked from this pore, which is then adsorbed onto the transportation belt 13. Other examples of the method of adsorbing the recording medium 8 to the transportation belt 13 may include a method in which the recording medium 8 is adsorbed electrostatically to the transportation belt 13 or a method in which the recording medium 8 is adhered by adhesion.

At the upstream side of the transporting direction, the electrostatic recording head 100 which forms an electrostatic latent image is placed with an interval above the recording medium 8 being delivered by transportation belt 13.

In the electrostatic recording head 100, a plurality of driving electrodes 104 are provided on the surface of an insulated substrate 102 of a plane rectangular shape so as to be parallel to each other, and a plurality of control electrodes 106 are formed on the back side so as to intersect with these driving electrodes 104. The matrix (grating) is formed by the driving electrode 104 and the control electrode 106. In the control electrode 106, a circular opening 106A is formed in the position which intersects with the driving electrode 104. On the underside of the control electrode 106, a screen electrode 108 is provided through the insulated substrate 101. In these insulated substrate 101 and screen electrode 108, a space 111 and an opening for ion transport 110 are formed in the position corresponding to the opening 106A of the control electrode 106.

A high frequency high voltage is applied between the driving electrode 104 and the screen electrode 108 by an alternating current power supply 112. On the other hand, in response to image information, a pulse voltage is applied to the control electrode 106 by an ion control power supply 114. Further, a direct voltage is applied to the screen electrode 108 by a direct current power supply 116.

A corona surface discharge is induced in a space 111 by applying an alternating electric field between the driving electrode 104 and the control electrode 106 which are insulated in this manner, and then the ion generated by this corona surface discharge is accelerated or absorbed by the electric field formed between the control electrode 106 and the screen electrode 108. Then, discharge of an ionic current from the opening for ion transport 110 is controlled and an electrostatic latent image (see FIG. 8A) is formed on the surface of the recording medium 8 by an ion (positive ion in the exemplary embodiment) responding to an image signal (ink image).

A potential of the electrostatic latent image may be a potential capable of supplying and adsorbing ink receiving particles 16 onto the recording medium 8 by an electrostatic force of electric field which may be formed by a particle supply roll 18A of the ink receiving particle supplying device 18 and the electrostatic latent image formed on the recording medium 8.

The region in which an electrostatic latent image is formed may be selected by this electrostatic recording head 100. Therefore, the electrostatic latent image formed on the surface of the recording medium 8 is the region in which an ink image is formed. For example, if the image to be formed is the Japanese character, it is as conceptually shown in FIG. 8A.

The recording medium 8 in which an electrostatic latent image is formed on the surface is delivered to the ink receiving particle supplying device 18. Thus, the electrostatic latent image is visualized and then the ink receiving particle layer 16A corresponding to the electrostatic latent image is formed (see FIG. 8B). Thus, in only the region of an ink image which is formed based on an image signal, the ink receiving particle layer 16A is formed on the recording medium 8 (the ink receiving particle layer 16A is hardly formed in a non-image area region).

Next, a process of forming an image will be described.

As shown in FIG. 8A, then the ink receiving particle layer 16A formed on the recording medium 8 is pre-fixed by the pre-fixing device 150.

The ink receiving particle layer 16A formed on the recording medium 8 is held on the recording medium 8 by an electrostatic force. Thus, when ink droplets 20A ejected from the inkjet recording head 20 are applied to the ink receiving particle layer 16A in the next process, the ink receiving particle layer 16A may be deteriorated depending on the amount of ink. For this reason, the ink receiving particles 16 are provisionally fixed on the surface of the recording medium 8 by preliminary pre-fixing the ink receiving particle layer 16A in advance.

The scattering of the ink receiving particles 16 by application of the ink droplets 20A and contamination of a nozzle face 20B of the inkjet recording head 20 are prevented by pre-fixing.

The temperature of preheating by the pre-fixing device 150 is lower than that of heating for final fixing in the fixing device 23. That is, the process of pre-fixing by the pre-fixing device 150 does not involve completely melting resin particles in the ink receiving particles 16 and fixing by pressure, but remaining gaps between particles and fixing particles and binding particles to the surface of the recording medium. Thus, the ink droplets 20A are pre-fixed to the extent that the droplets may be received.

As the pre-fixing device 150, a heating and fixing device (fuser) generally used for an electrophotographic image forming apparatus may be applied. Other than the heating and fixing device (fuser) generally used for an electrophotographic image forming apparatus, a heater heating method, an oven system, an electromagnetic induction heating system, and the like may be used.

Next, the recording medium 8 in which preliminary fixing of the ink receiving particle layer 16A has been carried out is conveyed under the inkjet recording head 20.

Ink droplets 20A ejected from the inkjet recording head 20 based on image data are applied to the ink receiving particle layer 16A formed on the recording medium 8, and the ink image is formed (see FIG. 8C). In this case, the ink is received in the ink receiving particles 16.

To write an image at high speed, as in the exemplary embodiment, a line type inkjet recording head having a width more than a recording medium width may be used, however by using a scan type inkjet recording head, images may be formed sequentially. The ink ejecting unit of the inkjet recording head 20 is not particularly limited as long as it is capable of ejecting ink, such as piezoelectric element drive type, or heater element drive type.

Next, the recording medium 8 is peeled off from the transportation belt 13 and delivered to the fixing device 23, and then pressure and heat are applied to the ink receiving particle layer 16A, thereby fixing the ink receiving particle layer 16A on the recording medium 8.

The fixing device 23 is composed of a heating roll 23A incorporating a heating source and a pressurizing roll 23B which is opposed to the heating roll 23A, and the heating roll 23A and pressurizing roll 23B contact each other to form a contact region. The heating roll 23A and pressurizing roll 23B are formed of an aluminum core, coated with silicone rubber on the outer surface, and are further covered with a PFA tube. Here, the fixing device 23 has the same configuration as the fixing device (fuser) used for an electrophotographic image forming apparatus. In addition to the heating and fixing unit generally used for an electrophotographic image forming apparatus, a heater heating method, an oven system, an electromagnetic induction heating system, and the like may be used.

When the recording medium 8 is passed through the contact region of the heating roll 23A and the pressurizing roll 23B, the ink receiving particle layer 16A is heated and pressurized, and thus ink receiving particle layer 16A is fixed to the recording medium 8. Other than the method using both heating and pressurizing, the method using only heating or pressurizing may be utilized. However, the manner in which heating and pressurizing are performed at the same time may be used.

The image formation is completed through the above process and the recording medium 8 is taken out of the apparatus.

In the recording apparatus 11 in another exemplary embodiment as described above, while the recording medium 8 is delivered by the transportation belt 13, an electrostatic latent image is formed by the electrostatic recording head 100. The ink receiving particles 16 are supplied to the electrostatic latent image by the particle supplying device 18 to form a particle layer. Then, on the particle layer, ink droplets are ejected from the inkjet recording head 20 to form an image. Thus, the ink receiving particles 16 receive the ink. Next, the recording medium 8 is peeled off from the transportation belt 13, and then pressure and heat are applied thereto by the fixing device 23, so that the ink receiving particle layer is fixed on the recording medium 8. The process except for the above-mentioned description is the same as that of the recording apparatus in the above-mentioned exemplary embodiment and therefore it will not be repeated here.

In the exemplary embodiment, ink droplets 20A are selectively ejected from the inkjet recording heads 20 in black, yellow, magenta, and cyan colors on the basis of image data, and a full-color image is recorded on the recording medium 8. However, the second exemplary embodiment is not limited to the recording of characters or images on a recording medium. That is, the recording apparatus of the second exemplary embodiment may be applied generally to liquid droplet ejection (jetting) apparatuses used industrially.

EXAMPLES

Hereinbelow, the present invention will be specifically described with reference to Examples, but the invention is not limited to these Examples. In the following, "part(s)" means "part(s) by weight".

<Preparation of Ink>

| (Ink 1) | |
|---|---|
| Black Pearls L | 5% by weight |
| Styrene/n-butyl methacrylate/methacrylic acid resin | 1.5% by weight |
| Glycerine | 17% by weight |
| 1,2-hexanediol | 8% by weight |
| Propylene glycol | 8% by weight |
| Nonionic surfactant | 1% by weight |
| Sodium hydroxide aqueous solution | an amount such that the ink has a pH of 8.0 |
| Ion exchanged water | the balance |

Ink 1 with the above composition is prepared, which has a viscosity of 5.1 mPa·s, a surface tension of 32 mN/m, and an electrical conductivity of 0.04 S/m. The value obtained by multiplying the electrical conductivity by the viscosity ($\sigma \times \eta$) is 0.20.

| (Ink 2) | |
|---|---|
| C.I. DIRECT BLUE 199 | 2.5% by weight |
| Diethylene glycol | 10% by weight |
| Glycerine | 15% by weight |
| Butyl carbitol | 2% by weight |
| N,N-bis-(2-hydroxyethyl)-2-aminoethanesulfonic acid | 2.0% by weight |
| Anionic surfactant | 1.0% by weight |
| Sodium hydroxide aqueous solution | an amount such that the ink has a pH of 10.2 |
| Ion exchanged water | the balance |

Ink 2 with the above composition is prepared, which has a viscosity of 3.1 mPa·s, a surface tension of 32 mN/m, and an electrical conductivity of 1.0 S/m. The value ($\sigma \times \eta$) is 3.1.

| (Ink 3) | |
|---|---|
| Special Black 4A | 6% by weight |
| Styrene/acrylic acid copolymer | 2% by weight |
| Nonionic surfactant | 0.5% by weight |
| Diethylene glycol | 20% by weight |
| Butyl carbitol | 5% by weight |
| Sodium hydroxide aqueous solution | an amount such that the ink has a pH of 7.2 |
| Ion exchanged water | the balance |

Ink 3 with the above composition is prepared, which has a viscosity of 3.6 mPa·s, a surface tension of 30 mN/m, and an electrical conductivity of 0.01 S/m. The value ($\sigma \times \eta$) is 0.036.

| (Ink 4) | |
|---|---|
| C.I. Food Black 2 | 2.0% by weight |
| Styrene/sodium acrylate copolymer | 2% by weight |
| Diethylene glycol | 10% by weight |
| Glycerine | 5% by weight |

| (Ink 4) | |
|---|---|
| Propylene glycol monobutyl ether | 5% by weight |
| Anionic surfactant | 1% by weight |
| N,N-bis-(2-hydroxyethyl)-2-aminoethanesulfonic acid | 0.5% by weight |
| Sodium hydroxide aqueous solution | an amount such that the ink has a pH of 8.5 |
| Ion exchanged water | the balance |

Ink 4 with the above composition is prepared, which has a viscosity of 3.1 mPa·s, a surface tension of 32 mN/m, and an electrical conductivity of 0.51 S/m. The value ($\sigma \times \eta$) is 1.58.

| (Ink 5) | |
|---|---|
| Black Pearls L | 4% by weight |
| Styrene/acrylic acid copolymer | 2% by weight |
| Acetylene glycol ethylene oxide adduct | 0.5% by weight |
| Propylene glycol | 10% by weight |
| Glycerine | 8% by weight |
| Sodium hydroxide aqueous solution | an amount such that the ink has a pH of 7.2 |
| Ion exchanged water | the balance |

Ink 5 with the above composition is prepared, which has a viscosity of 2.2 mPa·s, a surface tension of 30 mN/m, and an electrical conductivity of 0.01 S/m. The value ($\sigma \times \eta$) is 0.022.

| (Ink 6) | |
|---|---|
| C.I. Food black 2 | 3.0% by weight |
| Diethylene glycol | 15% by weight |
| Glycerine | 25% by weight |
| N,N-bis-(2-hydroxyethyl)-2-aminoethanesulfonic acid | 2.0% by weight |
| Butyl carbitol | 5% by weight |
| Anionic surfactant | 1% by weight |
| Sodium hydroxide aqueous solution | an amount such that the ink has a pH of 10.0 |
| Ion exchanged water | the balance |

Ink 6 with the above composition is prepared, which has a viscosity of 5.1 mPa·s, a surface tension of 31 mN/m, and an electrical conductivity of 1.1 S/m. The value ($\sigma \times \eta$) is 5.6.

| (Ink 7) | |
|---|---|
| Black Pearls L | 3.0% by weight |
| Styrene/n-butyl methacrylate/methacrylic acid copolymer | 0.3% by weight |
| Diethylene glycol | 7.5% by weight |
| Glycerine | 7.5% by weight |
| Propylene glycol | 0.05% by weight |
| Nonionic surfactant | 0.03% by weight |
| Sodium hydroxide aqueous solution | an amount such that the ink has a pH of 8.0 |
| Ion exchanged water | the balance |

Ink 7 with the above composition is prepared, which has a viscosity of 1.9 mPa·s, a surface tension of 30 mN/m, and an electrical conductivity of 0.01 S/m. The value ($\sigma \times \eta$) is 0.019.

| (Ink 8) | |
|---|---|
| Cabojet 200 | 9.0% by weight |
| Styrene/n-butyl methacrylate/methacrylic acid copolymer | 2.0% by weight |
| Diethylene glycol | 25% by weight |
| Glycerine | 15% by weight |
| Propylene glycol | 0.05% by weight |
| Nonionic surfactant | 0.03% by weight |
| Sodium hydroxide aqueous solution | an amount such that the ink has a pH of 9.0 |
| Ion exchanged water | the balance |

Ink 8 with the above composition is prepared, which has a viscosity of 8.5 mPa·s, a surface tension of 30 mN/m, and an electrical conductivity of 0.1 S/m. The value ($\sigma \times \eta$) is 0.85.

| (Ink 9) | |
|---|---|
| C.I. Food black 2 | 4.0% by weight |
| Diethylene glycol | 10% by weight |
| Glycerine | 30% by weight |
| N,N-bis-(2-hydroxyethyl)-2-aminoethanesulfonic acid | 2.0% by weight |
| Butyl carbitol | 5% by weight |
| Anionic surfactant | 2.0% by weight |
| Sodium acetate | 1.5% by weight |
| Ion exchanged water | the balance |

Ink 9 with the above composition is prepared, which has a viscosity of 6.3 mPa·s, a surface tension of 30 mN/m, and an electrical conductivity of 2.1 S/m. The value ($\sigma \times \eta$) is 13.23.

| (Ink 10) | |
|---|---|
| Special Black 4A | 4% by weight |
| Styrene/acrylic acid copolymer | 2% by weight |
| Nonionic surfactant | 0.3% by weight |
| Diethylene glycol | 15% by weight |
| Butyl carbitol | 5% by weight |
| Ion exchanged water | the balance |

Ink 10 with the above composition is prepared, which has a viscosity of 2.5 mPa s, a surface tension of 34 mN/m, and an electrical conductivity of 0.007 S/m. The value ($\sigma \times \eta$) is 0.0175.

<Preparation of Ink Receiving Particles>
(Particles A)
Styrene/2-ethylhexyl methacrylate/acrylic acid copolymer (acid value: 385)

100 g of the above material is dissolved in an organic solvent, and then 200 g of 5% by weight sodium hydroxide aqueous solution is added thereto. The mixed solution is stirred for 1 hour at room temperature, and then dried with a freeze dryer to obtain particles. The particles are further pulverized with a jet mill, and classified with a classifier. Thus, particles having an average equivalent spherical diameter of 8 μm and a neutralization degree of 0.4 are obtained.

Subsequently, to the particles thus obtained, 0.6% by weight of silica particles are added, and stirred with a mixer to obtain ink receiving particles.

| (Particles B) | |
|---|---|
| Styrene/n-butyl methacrylate/acrylic acid copolymer | 90% by weight |
| Styrene/2-ethylhexyl acrylate/acrylic acid copolymer | 10% by weight |

100 g of the above material is dissolved in an organic solvent, and then 250 g of 5% by weight sodium hydroxide aqueous solution is added thereto. The mixed solution is stirred for 1 hour at room temperature, and then dried with a freeze dryer to obtain particles. The particles are further pulverized with a jet mill, and classified with a classifier. Thus, particles having an average equivalent spherical diameter of 7 μm, an acid value of 460, and a neutralization degree of 0.4 are obtained.

Subsequently, to the particles thus obtained, 0.6% by weight of silica particles (average primary particle diameter: 12 nm) and 0.2% by weight of silica particles (average primary particle diameter: 16 nm) are added, and stirred with a mixer to obtain ink receiving particles.

(Particles C)

Styrene/2-ethylhexyl acrylate/methacrylic acid copolymer (acid value: 210)

100 g of the above material is dissolved in an organic solvent, and then 180 g of 5% by weight sodium hydroxide aqueous solution is added thereto. The mixed solution is stirred for 1 hour at room temperature, and then dried with a freeze dryer to obtain particles. The particles are further pulverized with a jet mill, and classified with a classifier. Thus, particles having an average equivalent spherical diameter of 8 μm and a neutralization degree of 0.6 are obtained.

Subsequently, to the particles thus obtained, 0.5% by weight of silica particles (average primary particle diameter: 16 nm) are added, and stirred with a mixer to obtain ink receiving particles.

| (Particles D) | |
|---|---|
| Styrene/butadiene/n-butyl acrylate/acrylic acid copolymer | 85% by weight |
| Styrene/acrylic acid copolymer | 15% by weight |

100 g of the above material is dissolved in an organic solvent, and then 300 g of 5% by weight potassium hydroxide aqueous solution is added thereto. The mixed solution is stirred for 1 hour at room temperature, and then dried with a freeze dryer to obtain particles. The particles are further pulverized with a jet mill, and classified with a classifier. Thus, particles having an average equivalent spherical diameter of 10 μm, an acid value of 190, and a neutralization degree of 0.8 are obtained.

Subsequently, to the particles thus obtained, 0.4% by weight of silica particles (average primary particle diameter: 12 nm) are added, and stirred with a mixer to obtain ink receiving particles.

| (Particles E) | |
|---|---|
| Styrene/maleic acid copolymer | 80% by weight |
| Styrene/2-ethylhexyl acrylate/acrylic acid copolymer | 20% by weight |

100 g of the above material is dissolved in an organic solvent, and then 800 g of 5% by weight potassium hydroxide aqueous solution is added thereto. Subsequently, 20 g of 5% by weight magnesium nitrate aqueous solution is added thereto, and the mixture is stirred for 1 hour at room temperature and dried with a freeze dryer to obtain particles. The particles are further pulverized with a jet mill, and classified with a classifier. Thus, particles having an average equivalent spherical diameter of 18 μm, an acid value of 630, and a neutralization degree of 0.9 are obtained.

Subsequently, to the particles thus obtained, 0.5% by weight of silica particles (average primary particle diameter: 16 nm) are added, and stirred with a mixer to obtain ink receiving particles.

| (Particles F) | |
|---|---|
| Styrene/n-butyl acrylate/methacrylic acid copolymer | 86% by weight |
| Styrene/n-butyl acrylate/acrylic acid copolymer | 14% by weight |

100 g of the above material is dissolved in an organic solvent, and then 40 g of 5% by weight potassium hydroxide aqueous solution is added thereto. The mixed solution is stirred for 1 hour at room temperature, and then dried with a freeze dryer to obtain particles. The particles are further pulverized with a jet mill, and classified with a classifier. Thus, particles having an average equivalent spherical diameter of 6 μm, an acid value of 90, and a neutralization degree of 0.4 are obtained.

Subsequently, to the particles thus obtained, 0.3% by weight of silica particles (average primary particle diameter: 16 nm) are added, and stirred with a mixer to obtain ink receiving particles.

| (Particles G) | |
|---|---|
| Styrene/n-butyl methacrylate/acrylic acid copolymer | 55% by weight |
| Styrene/n-butyl acrylate/acrylic acid copolymer | 45% by weight |

100 g of the above material is dissolved in an organic solvent, and then 60 g of 5% by weight potassium hydroxide aqueous solution is added thereto. The mixed solution is stirred for 1 hour at room temperature, and then dried by a spray drying method to obtain particles. The particles are classified with a classifier. Thus, particles having an average equivalent spherical diameter of 25 μm, an acid value of 45, and a neutralization degree of 0.9 are obtained.

Subsequently, to the particles thus obtained, 0.3% by weight of silica particles (average primary particle diameter: 16 nm) and 0.5% by weight of silica particles (average primary particle diameter: 12 nm) are added, and stirred with a mixer to obtain ink receiving particles.

| (Particles H) | |
|---|---|
| Styrene/n-butyl methacrylate/acrylic acid copolymer | 95% by weight |
| Styrene/n-butyl methacrylate copolymer | 5% by weight |

100 g of the above material is dissolved in an organic solvent, and then 150 g of 5% by weight potassium hydroxide aqueous solution is added thereto. The mixed solution is stirred for 1 hour at room temperature, and then dried by a spray drying method to obtain particles. The particles are classified with a classifier. Thus, particles having an average equivalent spherical diameter of 9 μm, an acid value of 90, and a neutralization degree of 0.85 are obtained.

Subsequently, to the particles thus obtained, 0.5% by weight of silica particles (average primary particle diameter: 16 nm) are added, and stirred with a mixer to obtain ink receiving particles.

| (Particles I) | |
|---|---|
| Styrene/2-ethylhexyl methacrylate/acrylic acid copolymer | 77% by weight |
| Styrene/2-ethylhexyl acrylate/acrylic acid copolymer | 23% by weight |

100 g of the above material is dissolved in an organic solvent, and then 500 g of 5% by weight potassium hydroxide aqueous solution is added thereto. Subsequently, 50 g of 5% by weight magnesium nitrate aqueous solution is added thereto, and the mixture is stirred for 1 hour at room temperature, and then dried with a freeze dryer to obtain particles. The particles are further pulverized with a jet mill, and classified with a classifier. Thus, particles having an average equivalent spherical diameter of 8 μm, an acid value of 730, and a neutralization degree of 0.5 are obtained.

Subsequently, to the particles thus obtained, 0.6% by weight of silica particles (average primary particle diameter: 16 nm) are added, and stirred with a mixer to obtain ink receiving particles.

| (Particles J) | |
|---|---|
| Styrene/n-butyl methacrylate/acrylic acid copolymer | 85% by weight |
| Styrene/n-butyl acrylate/acrylic acid copolymer | 15% by weight |

100 g of the above material is dissolved in an organic solvent, and then 80 g of 5% by weight potassium hydroxide aqueous solution is added thereto. Subsequently, 20 g of 5% by weight magnesium nitrate aqueous solution is added thereto, and the mixture is stirred for 1 hour at room temperature, and then dried with a freeze dryer to obtain particles. The particles are further pulverized with a jet mill, and classified with a classifier. Thus, particles having an average equivalent spherical diameter of 10 μm, an acid value of 650, and a neutralization degree of 0.1 are obtained.

Subsequently, to the particles thus obtained, 0.3% by weight of silica particles (average primary particle diameter: 12 nm) are added, and stirred with a mixer to obtain ink receiving particles.

(Particles K)

Styrene/2-ethylhexyl methacrylate/acrylic acid copolymer (acid value: 200)

The above material is pulverized with a jet mill and classified with a classifier to obtain particles having an average equivalent spherical diameter of 8 μm and a neutralization degree of 0.

Subsequently, to the particles thus obtained, 0.6% by weight of silica particles (average primary particle diameter: 12 nm) are added, and stirred with a mixer to obtain ink receiving particles.

(Particles L)

Styrene/2-ethylhexyl methacrylate/acrylic acid copolymer (acid value: 350)

100 g of the above material is dissolved in an organic solvent, and then 500 g of 5% by weight sodium hydroxide aqueous solution is added thereto. The mixed solution is stirred for 1 hour at room temperature, and then dried with a freeze dryer to obtain particles. The particles are further pulverized with a jet mill, and classified with a classifier. Thus, particles having an average equivalent spherical diameter of 33 μm and a neutralization degree of 1.0 are obtained.

Subsequently, to the particles thus obtained, 2.0% by weight of silica particles are added, and stirred with a mixer to obtain ink receiving particles.

Examples 1-12 and Comparative Examples 1-6

Using combinations of ink receiving particles and ink shown in Table 1, image formation is carried out by an inkjet method. In the image formation, an image formation apparatus (manufactured by FUJI XEROX CO., LTD.) which has a piezoelectric recording head capable of applying 2 pL ink per drop in an image density of 1200 dpi×1200 dpi (dpi: dot number per inch) is used.

TABLE 1

| | | Particles | | | | Ink | | | $(\sigma \times \eta)$:(Acid |
|---|---|---|---|---|---|---|---|---|---|
| | | Acid value (mg KOH/g) | Neutralization degree | Particle diameter (μm) | Acid value × Neutralization degree | Electrical conductivity (S/m) | Viscosity (mPa · s) | $\sigma \times \eta$ | value × Neutralization degree |
| Example 1 | A | 385 | 0.4 | 8 | 154 | 1 | 0.04 | 5.1 | 0.2 | 1:754 |
| Example 2 | A | 385 | 0.4 | 8 | 154 | 3 | 0.01 | 3.6 | 0.036 | 1:4278 |
| Example 3 | B | 460 | 0.4 | 7 | 184 | 2 | 1 | 3.1 | 3.1 | 1:59 |
| Example 4 | B | 460 | 0.4 | 7 | 184 | 8 | 0.1 | 8.5 | 0.85 | 1:216 |
| Example 5 | C | 210 | 0.6 | 8 | 126 | 1 | 0.04 | 5.1 | 0.2 | 1:618 |
| Example 6 | C | 210 | 0.6 | 8 | 126 | 3 | 0.01 | 3.6 | 0.036 | 1:3500 |
| Example 7 | D | 190 | 0.8 | 10 | 152 | 4 | 0.51 | 3.1 | 1.58 | 1:96 |
| Example 8 | E | 630 | 0.9 | 18 | 567 | 1 | 0.04 | 5.1 | 0.2 | 1:2779 |
| Example 9 | F | 90 | 0.4 | 6 | 36 | 2 | 1 | 3.1 | 3.1 | 1:12 |
| Example 10 | H | 90 | 0.85 | 9 | 76.5 | 5 | 0.01 | 2.2 | 0.022 | 1:3477 |
| Example 11 | I | 730 | 0.5 | 8 | 365 | 4 | 0.51 | 3.1 | 1.58 | 1:231 |
| Example 12 | J | 650 | 0.1 | 10 | 65 | 3 | 0.01 | 3.6 | 0.036 | 1:1806 |
| Comparative Example 1 | A | 385 | 0.4 | 8 | 154 | 7 | 0.01 | 1.9 | 0.019 | 1:8105 |
| Comparative Example 2 | G | 45 | 0.9 | 25 | 40.5 | 6 | 1.1 | 5.1 | 5.6 | 1:7 |
| Comparative Example 3 | K | 200 | 0 | 8 | 0 | 1 | 0.04 | 5.1 | 0.2 | 1:0 |
| Comparative Example 4 | L | 350 | 1.0 | 33 | 350 | 3 | 0.01 | 3.6 | 0.036 | 1:9722 |
| Comparative Example 5 | B | 460 | 0.4 | 7 | 184 | 9 | 2.1 | 6.3 | 13.23 | 1:14 |
| Comparative Example 6 | B | 460 | 0.4 | 7 | 184 | 10 | 0.007 | 2.5 | 0.0175 | 1:10514 |

[Evaluations]

(Liquid Absorbing Time)

Ink receiving particles are applied onto a PFA film (particles: 30 g/m²). 100% coverage pattern is formed thereon by applying ink by an inkjet method (2 pL ink per drop in an image density of 1200 dpi×1200 dpi).

A sheet of plain paper (C2 paper) is pressed against the image surface at a pressure of $10^5$ Pa, and the time until no ink is transferred to the plain paper is measured.

A: The drying time is less than 0.25 seconds.

B: The drying time is from 0.25 seconds to less than 0.5 seconds.

C: The drying time is from 0.5 seconds to less than 0.75 seconds.

D: The drying time is 0.75 seconds or more.

(Bleeding)

Ink receiving particles are applied onto a PFA film (particles: 30 g/m²). 3 dot line pattern is formed thereon by applying ink by an inkjet method (2 pL ink per drop in an image density of 1200 dpi×1200 dpi).

The obtained line pattern is observed with the naked eye or a microscope.

A: No bleeding is observed even when the image is magnified with a microscope.

B: bleeding can be observed when the image is magnified with a microscope, but the bleeding is not observed with the naked eye and thus is acceptable.

C: Bleeding is observed with the naked eye but acceptable.

D: Severe bleeding is observed with the naked eye and unacceptable.

(Optical Density/Evaluation Method A)

The evaluation of optical density of Examples 1-10 and Comparative Examples 1-6 is carried out in accordance with the following evaluation method A.

Ink receiving particles are applied onto a PFA film (particles: 30 g/m²). 100% coverage pattern is formed thereon by applying ink by an inkjet method (2 pL ink per drop in an image density of 1200 dpi×1200dpi). A sheet of OK KINFUJI paper is placed on the image surface, and the image is transferred to the OK KINFUJI paper and fixed through a fuser.

The obtained image is observed using an optical densitometer X-Rite 404 manufactured by X-Rite Incorporated.

A: The optical density is 1.3 or more.

B: The optical density is 1.2 or more but less than 1.3

C: The optical density is 1.1 or more but less than 1.2.

D: The optical density is less than 1.1.

(Optical Density/Evaluation Method B)

The evaluation of optical density of Examples 11 and 12 is carried out in accordance with the following evaluation method B.

Particles are applied onto a sheet of OK KINFUJI paper (particles: 30 g/m²). 100% coverage pattern is formed thereon by applying ink by an inkjet method (2 pL ink per drop in an image density of 1200 dpi×1200 dpi). A PFA film is placed on the image surface, and the image is fixed on the OK KINFUJI paper through a fuser.

The obtained image is observed using an optical densitometer X-Rite 404 manufactured by X-Rite Incorporated.

A: The optical density is 1.3 or more.

B: The optical density is 1.2 or more but less than 1.3

C: The optical density is 1.1 or more but less than 1.2.

D: The optical density is less than 1.1.

TABLE 2

| | Liquid absorbing time | Optical density | Bleeding |
|---|---|---|---|
| Example 1 | A | A | A |
| Example 2 | A | C | A |
| Example 3 | B | A | B |
| Example 4 | A | A | A |
| Example 5 | A | A | A |
| Example 6 | A | C | A |
| Example 7 | B | A | B |
| Example 8 | A | B | A |
| Example 9 | C | B | C |
| Example 10 | B | C | B |
| Example 11 | B | A | B |
| Example 12 | A | B | A |
| Comparative Example 1 | A | D | A |
| Comparative Example 2 | D | B | D |
| Comparative Example 3 | D | B | D |
| Comparative Example 4 | A | D | A |
| Comparative Example 5 | D | C | D |
| Comparative Example 6 | A | D | A |

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A material set for recording, comprising ink receiving particles and an ink, wherein
    the ink receiving particles contain a resin having an acid value of from about 50 mg KOH/g to about 750 mg KOH/g, the resin being a copolymer formed from monomers including one of acrylic acid and methacrylic acid, and the ink receiving particles having a neutralization degree of from more than 0 to less than 1, and
    the ink contains a colorant, a water-soluble solvent, and water, the ink having a value obtained by multiplying an electrical conductivity σ (S/m) of the ink by a viscosity η (mPa·s) of the ink being from about 0.02 to about 5.0.

2. The material set of claim 1, wherein the ink receiving particles have an average equivalent spherical diameter of from about 0.1 μm to about 20 μm.

3. The material set of claim 1, wherein the ink receiving particles are composite particles in each of which liquid absorbing particles are aggregated.

4. The material set of claim 1, wherein a value obtained by multiplying the acid value (mg KOH/g) of the resin by the neutralization degree of the ink receiving particles is from about 50 to about 500.

5. The material set of claim 1, wherein a ratio of the value obtained by multiplying an electrical conductivity σ (S/m) of the ink by a viscosity η (mPa·s) of the ink to the value obtained by multiplying the acid value (mg KOH/g) of the resin by the neutralization degree of the ink receiving particles is from about 1:200 to about 1:5000.

6. The material set of claim 1, wherein the electrical conductivity $\sigma$ of the ink is from about 0.01 S/m to about 2.0 S/m.

7. The material set of claim 1, wherein the ink receiving particles have a neutralization degree of from 0.1 to 0.9.

8. The material set of claim 1, wherein the ink receiving particles have a neutralization degree of from 0.2 to 0.8.

* * * * *